(12) United States Patent
Morimoto et al.

(10) Patent No.: US 9,293,168 B2
(45) Date of Patent: Mar. 22, 2016

(54) QUALITY EVALUATION METHOD, INFORMATION RECORDING MEDIUM, OPTICAL DISC DEVICE AND RECORDING/REPRODUCING SYSTEM

(71) Applicants: Hitachi Consumer Electronics Co., Ltd., Tokyo (JP); Hitachi-LG Data Storage, Inc., Tokyo (JP)

(72) Inventors: Yoshitaka Morimoto, Tokyo (JP); Soichiro Eto, Tokyo (JP); Koichi Watanabe, Tokyo (JP)

(73) Assignees: HITACHI CONSUMER ELECTRONICS CO., LTD., Tokyo (JP); HITACHI—LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 14/167,369

(22) Filed: Jan. 29, 2014

(65) Prior Publication Data

US 2014/0211601 A1    Jul. 31, 2014

(30) Foreign Application Priority Data

Jan. 30, 2013  (JP) ................................ 2013-014988

(51) Int. Cl.
| | |
|---|---|
| *G11B 7/004* | (2006.01) |
| *G11B 20/18* | (2006.01) |
| *G11B 20/10* | (2006.01) |

(52) U.S. Cl.
CPC ........ G11B 20/182 (2013.01); G11B 20/10305 (2013.01); *G11B 20/10333* (2013.01); *G11B 20/10398* (2013.01)

(58) Field of Classification Search
CPC .......... G11B 7/004; G11B 7/00; G11B 7/002; G11B 7/005; G11B 7/0052; G11B 20/10305; G11B 20/10314; G11B 20/10333; G11B 20/10398

USPC ............ 369/53.1, 53.11, 53.12, 53.19, 53.22, 369/53.42, 59.11, 275.3, 275.4
See application file for complete search history.

(56) References Cited

U.S. PATENT DOCUMENTS

| | | | | |
|---|---|---|---|---|
| 2003/0016609 | A1* | 1/2003 | Rushton ........... | G11B 11/10595 369/53.2 |
| 2004/0252617 | A1* | 12/2004 | Kitagaki .............. | G11B 7/0062 369/59.11 |

(Continued)

OTHER PUBLICATIONS

Fumihiko Yokogawa et al., Signal Processing for 15/27 GB Read-Only Disk System, Japanese Journal Applied Physics, Feb. 2000, pp. 819-823, vol. 39.

(Continued)

*Primary Examiner* — Thomas Alunkal
(74) *Attorney, Agent, or Firm* — Baker Botts L.L.P.

(57) ABSTRACT

When data is recorded on an optical disc, and stored for a long period of time, there is a need to periodically evaluate whether a quality of the recorded data is determined with time, or not. If the signal quality is lower than a given level as an evaluation result, a work for moving the data to a brand-new optical disc is required. However, in periodical inspection, if the number of optical discs is enormous, a large amount of time is required to evaluate all data recorded on the optical disc. In recording user data on the optical disc, a signal of a particular pattern having a lifetime shorter than a reference lifetime of the user data is recorded in a given area of the optical disc in advance, the particular pattern signal is reading at given time intervals, and processing on the user data is determined on the basis of the evaluation result of the signal quality.

15 Claims, 21 Drawing Sheets

(56) References Cited

U.S. PATENT DOCUMENTS

| | | | |
|---|---|---|---|
| 2006/0023595 A1* | 2/2006 | Erickson | G11B 7/24 369/53.2 |
| 2006/0168499 A1* | 7/2006 | Edwards | G06F 11/008 714/763 |
| 2009/0168623 A1* | 7/2009 | Furumiya | G11B 7/1267 369/53.2 |
| 2009/0180369 A1* | 7/2009 | Kimmelmann | G11B 19/04 369/53.44 |
| 2010/0002556 A1 | 1/2010 | Miyashita et al. | |
| 2010/0260025 A1 | 10/2010 | Minemura et al. | |
| 2011/0235487 A1* | 9/2011 | Kurebayashi | G11B 7/00458 369/53.22 |
| 2011/0317534 A1* | 12/2011 | Kishigami | G11B 7/005 369/53.26 |
| 2013/0088947 A1* | 4/2013 | Cho | G11B 7/00456 369/59.11 |
| 2014/0086032 A1* | 3/2014 | Nakao | G11B 20/10462 369/53.35 |

OTHER PUBLICATIONS

Yoshihisa Adachi et al., New Method for Adjusting Write Strategy Using Sequenced Amplitude Margin, Japanese Journal of Applied Physics, 2006, pp. 1061-1065, vol. 45, No. 2B.

* cited by examiner

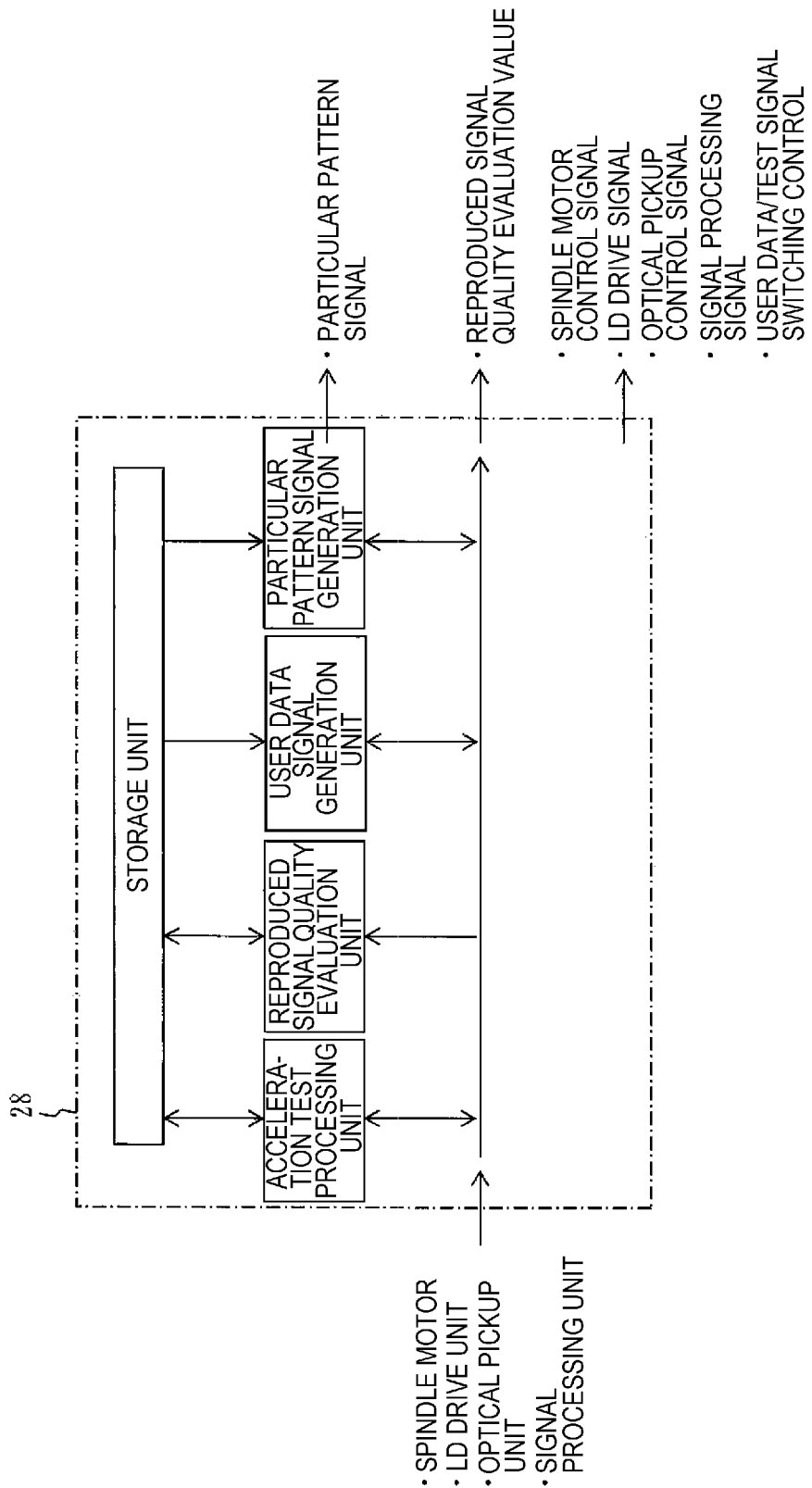

FIG. 6

SIGNAL OF PARTICULAR PATTERN

| RECORDED WAVEFORM | A | B | C (REFERENCE) | D |
|---|---|---|---|---|
| MODULATION DEGREE | 45 % | 50 % | 55 % | 60 % |
| INITIAL QUALITY [i-MLSE] | 9.5 % | 9.6 % | 9.5 % | 9.7 % |
| LIFETIME | 60 YEARS | 80 YEARS | 100 YEARS | 20 YEARS |

FIG. 9

| HEADER INFORMATION | |
|---|---|
| MEDIUM SPECIFIC INFORMATION | DISC INFORMATION |
| | RECORDING SPEED INFORMATION |
| | EDGE FLUCTUATION INFORMATION |
| | READING LIGHT ACCELERATION CONDITION |
| | ... |
| RECORDING POWER INFORMATION | Pw, Pm, Ps, Pc SETTING INFORMATION |
| RECORDING PULSE INFORMATION | $dT_{top}$ SETTING INFORMATION |
| | $T_{top}$ SETTING INFORMATION |
| | $dT_c$ SETTING INFORMATION |
| | $T_{lp}$ SETTING INFORMATION |
| | $dT_s$ SETTING INFORMATION |
| | ... |
| FOOTER INFORMATION | |

FIG. 10

| RECORDED WAVEFORM | TARGET MODU-LATION DEGREE | LIFETIME |
|---|---|---|
| A | 45% | 70 YEARS |
| B | 50% | 85 YEARS |
| C | 55% | 100 YEARS |
| D | 60% | 20 YEARS |
| E | 65% | 15 YEARS |
| F | 70% | 10 YEARS |
| G | 75% | 5 YEARS |

| RECORDED WAVEFORM | MODULATION DEGREE | INITIAL β | LIFETIME |
|---|---|---|---|
| A' | 55% | -6.0 % | 50 YEARS |
| B' | 55% | -3.0 % | 75 YEARS |
| C' | 55% | 0.0 % | 100 YEARS |
| D' | 55% | 3.0 % | 70 YEARS |
| E' | 55% | 6.0 % | 45 YEARS |

FIG. 16

SIGNAL 2 OF PARTICULAR PATTERN

| USED WAVEFORM | A' | B' | C' |
|---|---|---|---|
| MODULATION DEGREE | 55 % | 55 % | 55 % |
| INITIAL β | -6 % | -3 % | 0 % |
| INITIAL QUALITY [i-MLSE] | 10.6% | 10.1 % | 9.5 % |
| LIFETIME | 60 YEARS | 85 YEARS | 100 YEARS |

QUALITY EVALUATION METHOD, INFORMATION RECORDING MEDIUM, OPTICAL DISC DEVICE AND RECORDING/REPRODUCING SYSTEM

CROSS-REFERENCE TO RELATED APPLICATION

This application claims the priority of Japanese Patent Application No. 2013-14988, filed Jan. 30, 2013, which is incorporated herein by reference in its entirety.

BACKGROUND OF THE INVENTION

1. Field of the Invention

The present invention relates to a quality evaluation method, an optical disc device, recording/reproducing system, and information recording medium suitable for conducting quality evaluation in an optical information reproducing apparatus which reads information by irradiating an optical information recording medium.

2. Background Art

At present, as optical disc which is an optical information recording medium, a CD (compact disc), a DVD (digital versatile disc), a BD (blu-ray disc), and BDXL™ are commercialized, and extensively diffused. Those optical disc medium has various types such as a ROM (read only memory) type which is a read-only type, an R (readable) type which is a write-once type, and an RE (rewritable) type which is a rewritable type.

The recording and read of information on an optical disc is conducted by irradiating an optical disc medium with a laser beam. The information is recorded by forming an area in which a state of a recording film material is changed by a heat of the laser beam. The area in which the state is changed is called "mark", and an area in which the state is not changed is called "space". Signals are recorded on a recording layer by the combination of the marks and the spaces. In order to realize such recording, a recording film of the optical disc medium is made of a phase-change material, an alloy of an organic dye and an inorganic material, or an oxide. In production of the information, the recording layer on which the signals have been recorded are irradiated with the laser beam having a power lower than that in recording, and recording signals are read on the basis of a difference in the amount of reflected light between the marks and the spaces.

Because the optical disc is a medium commutative storage, the combination of the optical disc medium and the optical disc device is frequently changed. For that reason, the optical disc device adjusts recording and read according to the present combination. For example, in the recording, a recording power and a light emission waveform used in recording are adjusted according to the medium. Also, in order to put an optical spot at the time of recording and read into an optimal state, an objective lens, a collimator lens, and a lens tilt are also adjusted.

In the optical disc, in order to implement those adjustments, various indexes for evaluating the reading signal quality have been proposed. As general indexes, there are an SER (symbol error rate), a BER (byte error rate), and a bER (bit error rate), which are error probabilities of symbols, bytes, and bits in decode results, which are also used in an optical communication. Also, there is a jitter which is an index for evaluating a temporal fluctuation quantity of a signal to a read clock. Different from the above general index, a large number of evaluation indexes based on the reading signal processing system of the optical disc have been also proposed. For a BD, Japanese Journal of Applied Physics Vol. 39, 2000, pp. 819-823 discloses a limit equalizer jitter, and Japanese Journal of Applied Physics Vol. 45, No. 2B, 2006, pp. 1061-1065 discloses a SAM (sequenced amplitude margin). The limit equalizer jitter is a jitter in results of processing the reading signal by a limit equalizer. The SAM is an index for evaluating an error difficulty of the reading signal waveform on the basis of a target signal waveform and an error signal waveform when the reading signal processing of the PRML (partial response maximum likelihood) is applied to the BD. Also, for BDXL™, US2010/0002556 discloses an i-MLSE (integrated-maximum likelihood sequence error estimation), and US2010/0260025 discloses an L-SEAT (run-length-limited sequence error for adaptive target). The i-MLSE and L-SEAT are indexes in which the distribution of an error quantity of the reading signal waveform to the target signal waveform is quantified by a standard variation. In the optical disc, those indexes are used to evaluate the reading signal quality and implement the adjustment at the time of recording and read.

When data is recorded on the optical disc, and saved for a long period of time, there is a need to periodically evaluate an overall surface of the optical disc as to whether a quality of the recorded data is deteriorated with time, or not. If the signal quality is lower than a given level as an evaluation result, a work for moving the data to a brand-new optical disc is required.

SUMMARY OF THE INVENTION

A method for periodically evaluating the overall surface of the optical disc has not been studied up to now. In the quality evaluation, the degree of the quality deterioration can be confirmed by subjecting the data recorded on the optical disc to a front-surface read evaluation. However, in periodical inspection of the optical disc medium, if the number of optical discs is enormous, a large amount of time is required to evaluate all data recorded on the optical disc, and therefore this quality evaluation is not realistic.

To solve the above problem, in a medium on which a signal of a particular pattern having a lifetime shorter than a reference lifetime of user data is recorded in a given area of the optical disc, the particular pattern signal is reading at given time intervals, and processing on the user data is determined on the basis of the evaluation result of the signal quality. Specifically, the quality deterioration quantity and the lifetime of the user data are estimated to determine a time at which the user data is moved to the brand-new optical disc. With this configuration, because there is no need to evaluate the overall surface of the optical disc, the evaluation time can be remarkably reduced.

The signal of the particular pattern may be a signal that reaches the lifetime earlier than the reference lifetime of the user data. For example, the signal is gradually changed in signal level with the change of asymmetry, a β value, or a recording power of the signal, or gradually changed in signal modulation degree with the change of the recorded waveform and the recording power although the signal quality immediately after recording is the same.

A configuration of a specific device includes a recording/read unit that records and reads data on the optical disc, and a quality evaluation unit that evaluates the quality of the reading data, in which the recording/read unit records, for example, a signal of a particular pattern comparable to signal quality immediately after recording, but different mainly in signal modulation degree in a given area of the optical disc when recording user data on the optical disc, the recording/reading unit reads the signal of the particular pattern recorded in the area at a time when a given time elapses, and the quality evaluation unit estimates the quality deterioration of the user data from the evaluation result of the quality of the reading signal of the particular pattern.

With the above configuration, because there is no need to evaluate the overall surface of the optical disc, the evaluation time can be remarkably reduced.

BRIEF DESCRIPTION OF THE DRAWINGS

FIG. 4 is an exemplary block diagram illustrating a main configuration of a control unit in the optical archive device according to the embodiment of the present invention;

FIG. 6 is a diagram illustrating an example in which a signal modulation degree is changed by a particular pattern used in the recorded signal evaluation method according to the present invention;

FIG. 9 is an exemplary diagram illustrating information included in a DI (disc information) of the optical disc according to the embodiment of the present invention;

FIG. 10 is an exemplary diagram illustrating calculation results of a modulation degree, an initial β, and a lifetime of recorded signals of recorded waveforms A to G, and recorded waveforms A' to E';

FIG. 16 is a diagram illustrating an example in which the initial β is changed with the particular pattern used in the recorded signal evaluation method according to the present invention;

DETAILED DESCRIPTION OF THE PREFERRED EMBODIMENTS

First Embodiment

Figure 1:
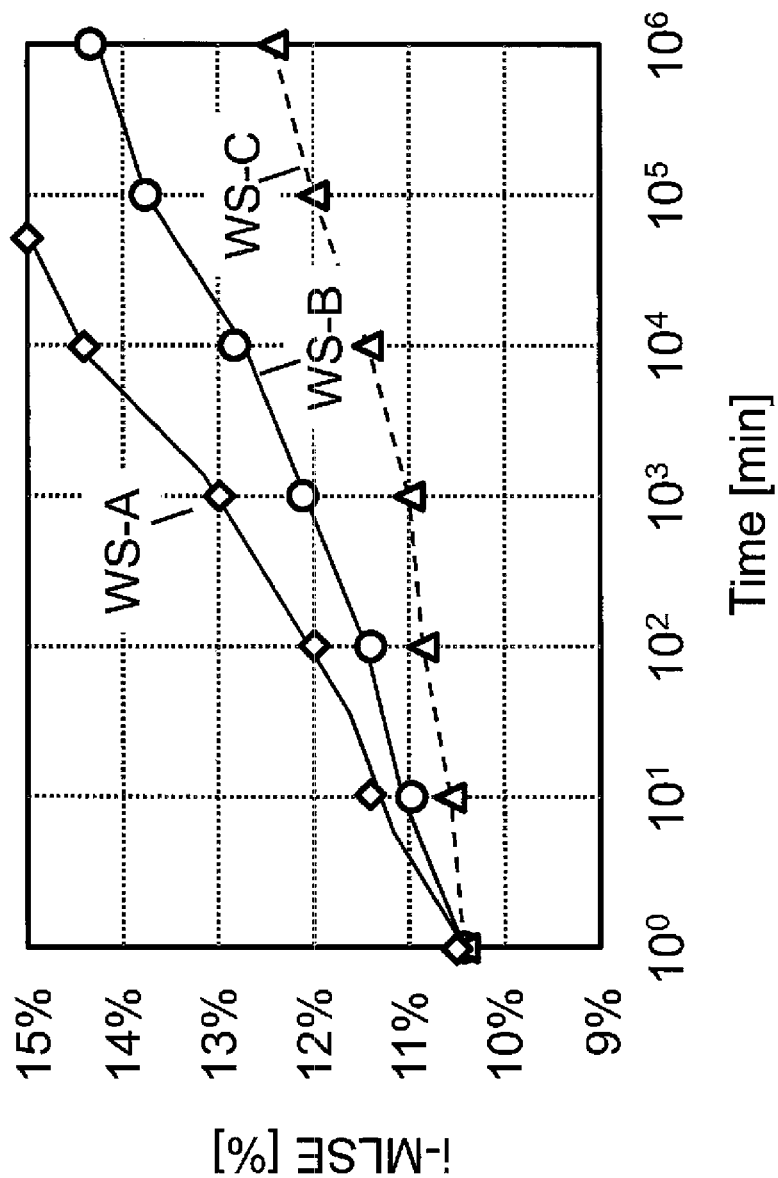
FIG. 1 is an exemplary diagram illustrating results of measuring a change in i-MLSE with time through a constant-temperature oven acceleration test, in recorded signals of a recorded waveform A, a recorded waveform B, and a recorded waveform C.

First, in order to confirm a difference in a signal deterioration rate caused by a recorded waveform, in an optical disc of BDXL™ standard, three kinds of recorded waveforms comparable in i-MLSE immediately after recording are created. A recorded waveform A (write strategy-A: WS-A), a recorded waveform B (WS-B), and a recorded waveform C (WS-C) are different mainly in modulation degree, which are 45%, 50%, and 55%, respectively. In this example, WS-C is a suggested recorded waveform, and the user data is recorded with the use of those recorded waveforms. A constant-temperature oven acceleration test is implemented on the signals recorded with the use of those recorded waveforms, and results of measuring the deterioration rate are illustrated in FIG. 1. The constant-temperature oven acceleration test is a technique in which the optical disc is stored in an environment higher in temperature and humidity than suggested storage conditions to promote a chemical change of a recording film material, and a mechanical change in the substrate, which is a test method for reproducing the time deterioration in a short time. As apparent from FIG. 1, three signal qualities immediately after recording are comparable to each other, but among those signal qualities, the recorded signal of WS-A is fastest in the deterioration, and WS-B is the second highest. The signal (WS-C) recorded in the suggested recorded waveform is the slowest in the deterioration among the three recorded signals. The quality deterioration rate of the recorded signals of WS-A and WS-B is about 1.6 and 1.1 times as quick as that of the recorded signal of the recorded waveform C. From the above results, the recorded signals of WS-A and WS-B are set as the particular pattern signals, the amount of deterioration of the user data can be estimated according to the amount of deterioration of the particular pattern signals in a short time, and the lifetime of the user data can be estimated. Since the lifetime is clarified, a period for evaluating the signal quality of all the user data can be shortened, and a periodic inspection time of the signal quality can be shortened. As a result, a load to the system can be reduced, and the data can be moved to a brand-new medium without any loss of the data.

Figure 2:
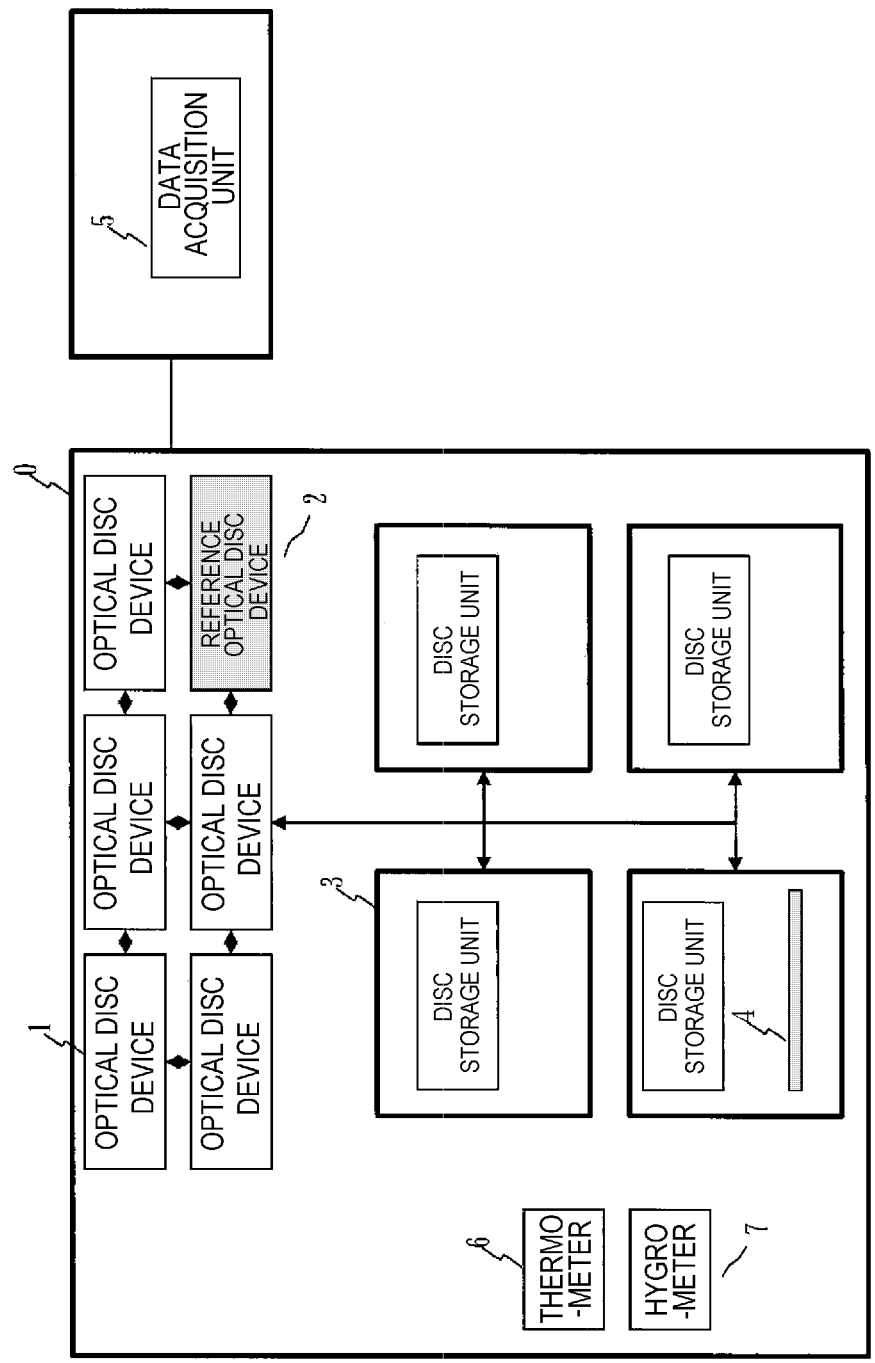
FIG. 2 is an exemplary block diagram illustrating an overall configuration of an optical archive device according to an embodiment of the present invention.
Figure 3:
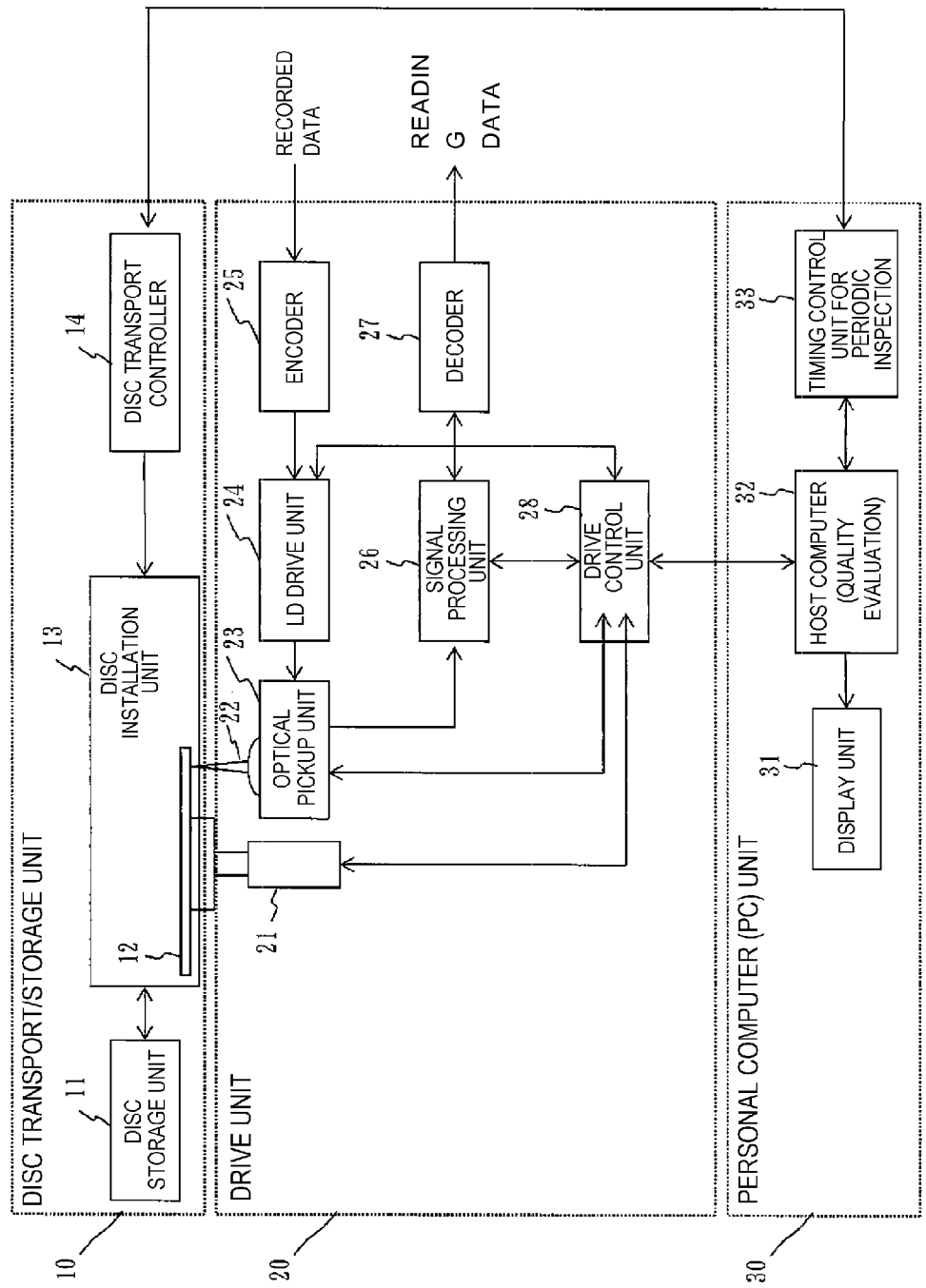
FIG. 3 is an exemplary block diagram illustrating a main configuration of the optical archive device according to the embodiment of the present invention.

Subsequently, an optical disc device used in evaluation of the recorded signal according to the present invention will be described. FIGS. 2 and 3 illustrate overall and main configurations of an optical archive device according to an embodiment of the present invention, respectively.

An optical archive device 0 according to this embodiment includes, as recording/reading devices of a signal, a plurality of optical disc devices 1, and a reference optical disc device 2. The reference optical disc device has a function of evaluating whether a recorded performance of the recorded optical disc satisfies the specification, or not. As the recording medium, an optical disc 3 having a structure in which a plurality of optical discs are stacked on each other, and housed within a package is used. Likewise, a reference disc 4 is housed in the plurality of optical discs. The reference disc 4 is intended for evaluating the read performance of the optical disc device. For example, a large-capacity recordable BDXL™ is suitable for the optical disc. It is needless to say that another kind of discs (BD, DVD, CD, etc.) may be applied, and the discs can be also dealt with alone one by one. The configuration of the device includes a disc transport/storage unit 10, a drive unit 20, and a personal computer (PC) unit 30. In the disc transport/storage unit 10, a plurality of optical disc media is stored in a disc storage unit 11. A disc installation unit 13 installs an instructed optical disc 12 from the discs housed in the disc storage unit 11. When the disc is of a two-sided recording type, the disc installation unit 13 also conducts disc reversing operation. A disc transport controller 14 controls the disc installation unit 13 to select the disc to be installed.

The drive unit 20 records and reads data with respect to the installed optical disc 12. Also, the drive unit 20 reads recorded data from the optical disc 12, and evaluates the quality of the data. As components of the drive unit 20, the optical archive device includes, as a main configuration, a spindle motor 21, an optical pickup unit 23, an LD drive unit 24, an encoder 25, a signal processing unit 26, a decoder 27, and a drive control unit 28. The spindle motor 21 controls the optical disc 12 by a CLV (constant linear velocity) or a CAV (constant angular velocity). The optical pickup unit 23 is disposed to face the optical disc 12, and emits a laser beam 22 of a recording power from a laser diode (LD) to record a signal on the optical disc 12. The optical pickup unit 23 emits the laser beam 22 of a read power from the LD to read the recorded signal. Further, when the optical disc 12 is rewriteable, the optical pickup unit 23 emits the laser beam 22 of an erasing power (read power<erasing power<recording power) from the LD to erase the recorded signal.

When the signal is recorded, the recorded data is encoded by the encoder 25, and supplied to the LD drive unit 24. The LD drive unit 24 determines a drive signal on the basis of the encoded recorded waveform, supplies the drive signal to the LD within the optical pickup unit 23, and records the signal. A recording power value in the LD drive unit 24 is determined according to a control signal from the drive control unit 28. The drive control unit 28 conducts trial recording in a trial recording area of the optical disc 12 with the use of plural kinds of recording powers, prior to recording the signal, and determines an optimal recording power on the basis of a signal of the trial recording. Further, the drive control unit 28 conducts the trial recording with the use of plural kinds of recorded waveforms, determines an optimal recorded waveform on the basis of the trial recording signal, and records a signal of the user data stored in the disc. In this situation, the drive control unit 28 also generates a signal of a particular pattern for evaluation of the recorded signal.

On the other hand, during the data reading, the read signal output from the optical pickup unit 23 is supplied to the signal processing unit 26. The signal processing unit 26 includes an RF amplifier, an equalizer, a binarization unit, and a PLL unit, processes the reading signal through those components, and supplies the reading signal to the signal processing unit 26. The decoder 27 decodes the signal on the basis of the binarized reading signal and a synchronous clock reading by the PLL unit, and outputs the signal as reading data. The signal processing unit 26 also calculates the reading signal quality of SER, BER, bER, jitter, limit equalizer jitter, i-MLSE, and L-SEAT. Also, the signal processing unit 26 acquires not only the user data but also test data from the signal of the particular pattern. The reading signal and a reading signal quality index value of the processed results in the signal processing unit 26 are also supplied to the drive control unit 28 as a reading signal evaluation. The drive control unit 28 controls the operation of the respective units within the drive unit 20, switches the recording operation and the read operation to each other, and switches the user data and the signal of the particular pattern to each other. Also, the reading signal is also supplied to the drive control unit 28 from the optical pickup unit 23 to measure an upper envelope, a lower envelope, and signal amplitude of the reading signal. The signal quality is evaluated on the basis of those numerical values. Further, the drive control unit 28 also generates a focus server signal, a tracking control signal, a spindle motor control signal, and an LD drive control signal during the recording/reading operation. The optical pickup and the spindle motor are controlled on the basis of those signals. Since the optical pickup and the spindle motor are identical with the related art, their description will be omitted.

The drive control unit 28 is specifically configured by a CPU and a memory (ROM, RAM), and realize various functions by the combination of those components. For example, the drive control unit 28 has a function of calculating the signal quality of the particular pattern from the reading signal, estimating the lifetime of the user data on the basis of the calculation result, and determining a time at which the data is moved to a brand-new medium. A function block of the drive control unit 28 in FIG. 3 is illustrated in FIG. 4. The drive control unit 28 includes the acceleration test processing unit, a reading signal quality evaluation unit, a user data signal generation unit, a signal generation unit of the particular pattern, and a storage unit. The acceleration test processing unit has a function of acquiring acceleration test conditions such as a read speed, a read power, a high frequency superposition, and an acceleration test time, and calculating various indexes (reflectance, modulation degree, jitter, asymmetry, β, etc.) according to the reading signal. The acquired information is stored in the storage unit. Also, the acceleration test processing unit starts and terminates the acceleration test, and changes the acceleration test conditions, based on the information read out from the storage unit. Because the conditions of the acceleration test are different depending on the types (SL, DL, TL, QL, etc.) of the optical discs 12, and depending on the read speed, the conditions are changed according to the types of the optical discs 12. The reading signal quality evaluation unit implements the quality evaluation of the recorded signal on the basis of the reading signal and the information acquired from an RF signal processing unit. The quality evaluated values are stored in the storage unit as needed. Also, the reading signal quality evaluation unit outputs a measured value or a temporal variation as the signal quality evaluation value. The user data signal generation unit adjusts the recorded waveform and determines an optimal recorded waveform on the basis of the user data acquired from the storage unit, outputs the recorded waveform as a power control signal, and supplies the power control signal to the LD drive unit 24. The signal generation unit of the particular pattern determines the recorded waveform of the particular pattern signal on the basis of a lifetime ratio of the user data acquired from the storage unit and the signal of particular pattern, and a lifetime distribution, outputs the determined recorded waveform as a power control signal, and supplies the power control signal to the LD drive unit 24.

The personal computer (PC) unit 30 is connected to the disc transport/storage unit 10 and the drive unit 20, and controls those units 10 and 20. A host computer 32 delivers the user data to be recorded on and reading from the optical disc 12 with respect to the drive unit 20. Also, the host computer 32 conducts the quality evaluation on the signal of the particular pattern transmitted from the drive unit 20. Then, the host computer 32 conducts the lifetime estimation on the user data from the evaluation result. When a data storage time reaches an estimated time, a display unit 31 generates a warning indicating that the user data is deteriorated. A timing control unit 33 for periodic inspection selects the optical disc to be evaluated in quality, determines a quality inspection interval, and instructs the disc transport/storage unit 10 on the selected optical disc and the determined quality inspection interval.

Then, a description will be given of a signal evaluation method for periodically evaluating the signal quality of the particular pattern, and estimating the amount of deterioration of the user data and the lifetime of the user data from the evaluated results, with the use of the above-mentioned optical disc device.

Figure 5A:
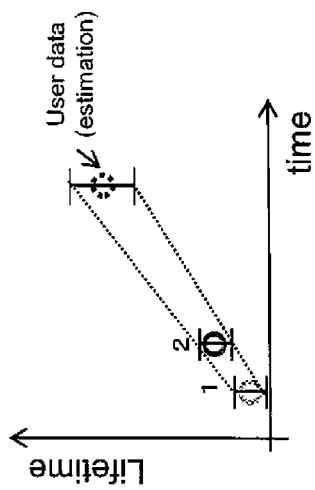
FIGS. 5A and 5B are diagrams illustrating a method for evaluating a recorded signal quality according to the embodiment of the present invention.
Figure 5B:
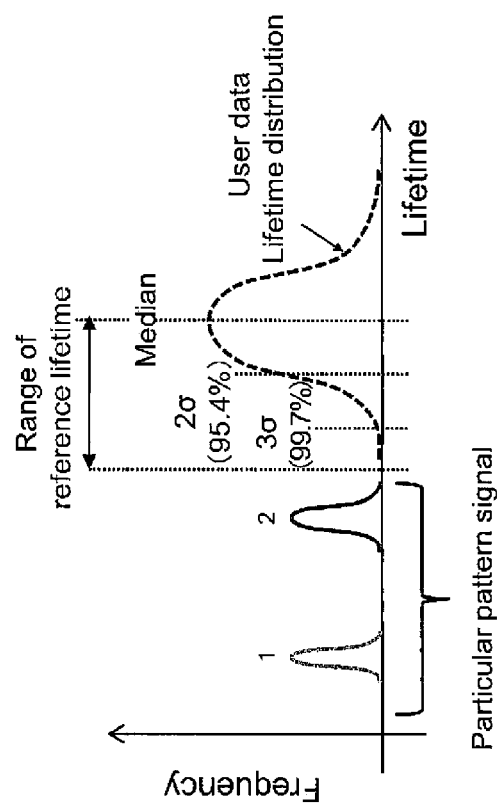

FIGS. 5A and 5B are diagrams illustrating a method for evaluating a recorded signal quality of the optical disc according to the embodiment of the present invention. In the conventional data recording operation, only the user data is recorded on the optical disc 12. On the other hand, in the recorded quality evaluation method according to this embodiment, the particular pattern signal faster in the deterioration than the user data when recording the user data is recorded. FIG. 5A illustrates a recorded signal that fails before the reference lifetime of the user data, a particular pattern signal 1, and a particular pattern signal 2. Also, the particular pattern signal 1 is a recorded signal higher in sensitivity to a stress than the particular pattern signal 2. In this example, the reference lifetime may be set as, for example, an intermediate value of a user data lifetime distribution in which data of at least 50 optical discs among 100 optical discs on which the user data has been recorded is not lost. Further, in order to improve the reliability, the reference lifetime may be set, for example, as a time of 2σ of a user data lifetime distribution in which data of at least 95 optical discs among 100 optical discs on which the user data has been recorded is not lost. More preferably, the reference lifetime may use a time of 3σ of a user data lifetime distribution in which data of at least 99 optical discs among 100 optical discs on which the user data has been recorded is not lost. In this way, the reference lifetime can be arbitrarily determined within a range of the reference lifetime illustrated in FIG. 5A.

In this example, because the particular pattern is a signal for detecting the deterioration degree of the user data, it is basic to record the particular pattern together with the user data. Therefore, it is desirable to record the particular pattern in any period between immediately before and immediately after the user data is first recorded. It is conceivable that the user data first recorded on the disc is deteriorated faster than the user data that is thereafter additionally recorded. For that reason, the particular pattern is also recorded when the user data is first recorded, and the recorded particular pattern is evaluated, thereby being capable of detecting the deterioration degree of the signal that is most liable to be deteriorated within the medium.

On the other hand, when the particular pattern is recorded at the time of additionally recording the user data, the additionally recorded particular pattern is longer in lifetime than the initially recorded particular pattern. Therefore, this is improper for protection of all the data within the disc, but can be used for an improvement in the evaluation precision of the deterioration degree as the medium.

Also, different from the above conditions, in the case of the medium whose shelf characteristic (a recording characteristic of an unrecorded portion is deteriorated with time) is low, it is not known which of the user data initially recorded and the user data additionally recorded reaches the end of the lifetime in first. In that case, every time the respective user data is recorded, the particular pattern is recorded, and all of the particular patterns are evaluated each time, to thereby enable all of the user data to be protected.

Also, the signal of the particular pattern according to this embodiment is comparable in the signal quality immediately after recording to the user data, or different in the recording signal level. In this case, as illustrated in FIG. 5B, the signal of the particular pattern is higher in the sensitivity to the stress than the user data, and a read error is liable to be generated due to the temporal deterioration. Therefore, the quality deterioration of the user data can be early predicted, or the lifetime can be clarified.

FIG. 6 is a diagram illustrating an example of the signal of the particular pattern used in the recorded signal evaluation method. The particular pattern is, for example, a random signal pattern, and a signal to be recorded may be as long as the quality of a random signal is measured, and is recorded, for example, for one cluster. Also, for example the signal may be recorded for five adjacent tracks, or more. In this embodiment, a signal for one cluster is recorded. In this embodiment, the recorded waveform C is the suggested waveform, and the user data is recorded on the optical disc with the use of that recorded waveform. As illustrated in FIG. 6, the particular pattern signal is used in which the signal modulation degree is gradually changed, and the recorded waveform is adjusted so that signal quality immediately after recording is comparable to the signal quality of the particular pattern and the user data. The signal of the particular pattern is recorded at a given position of the optical disc with the use of the above recorded waveform, and the signal of the particular pattern is subjected to the read evaluation. The identification of the recorded signals A, B, C, and D may be conducted, for example, by a difference in the modulation degree. Also, for example, the recorded signals different in code may be used. As a method of recording the particular pattern signal used in this embodiment, there are a method of adjusting the recorded waveform so that the signal quality immediately after recording is comparable to the signal quality of the particular pattern and the user data as described above, and gradually changing the modulation degree, and a method of adjusting the recorded waveform so as to keep a constant modulation degree, and changing the asymmetry or the β value immediately after recording. In this method, in the optical disc having a feature that a record mark size is changed with the temporal deterioration, a change in a balance difference between the signal levels of shorter marks and longer marks can be detected with high sensitivity. The detail will be described in a fourth embodiment.

Figure 7:
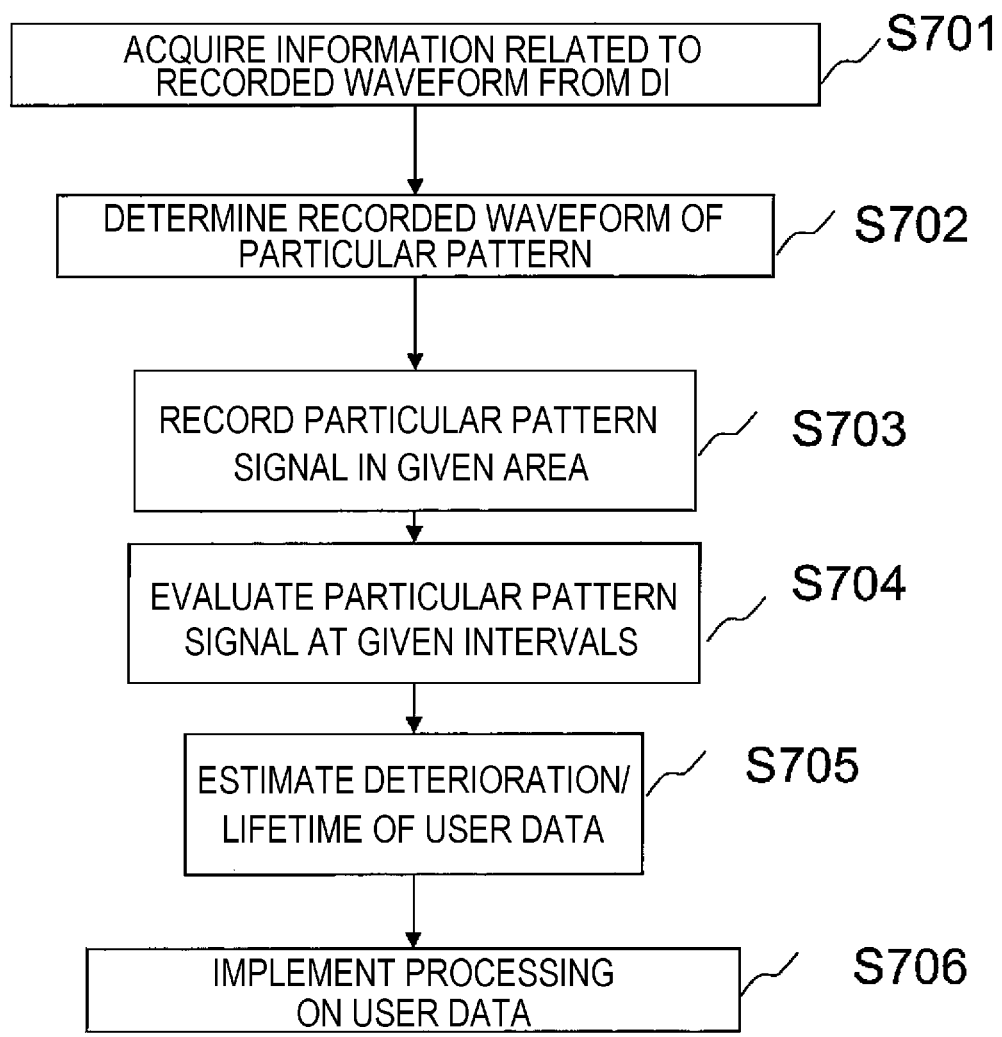
FIG. 7 is an exemplary flowchart illustrating a procedure of the method for evaluating the quality of the recorded signal, related to the determination of a method for moving data to a brand-new optical disc without any loss of user data.
Figure 8:
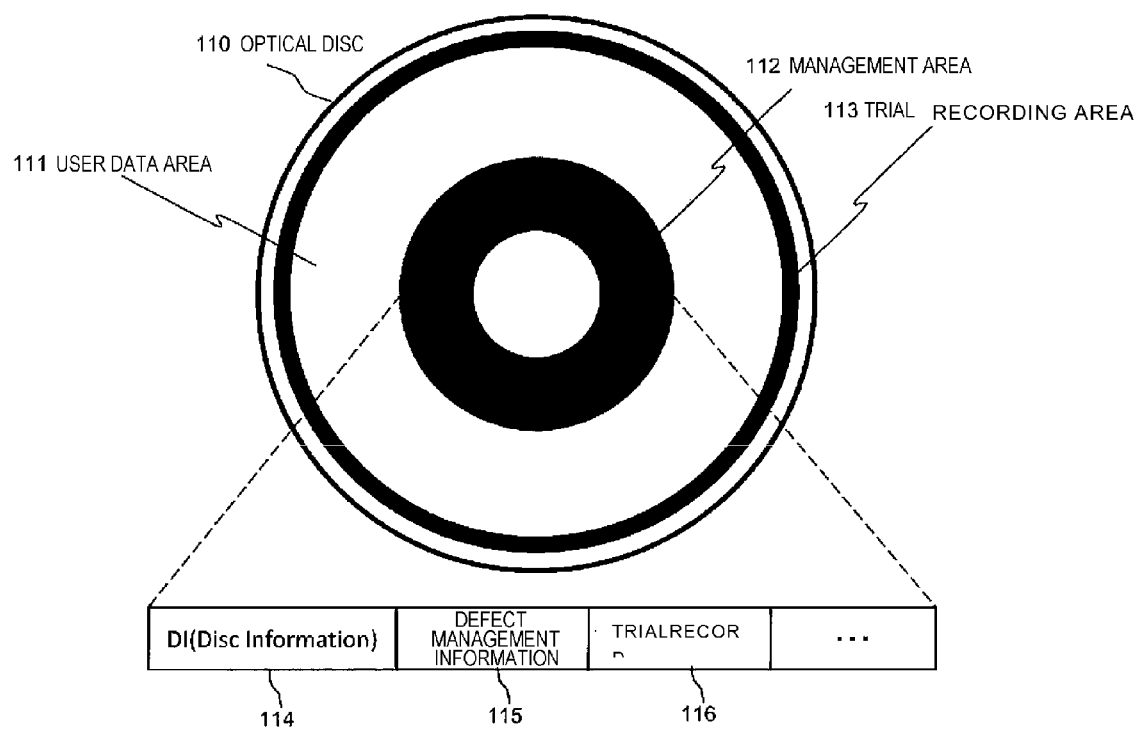
FIG. 8 is an exemplary diagram illustrating a configuration of the optical disc according to the embodiment of the present invention.

Subsequently, a description will be given of a method for determining the recorded waveform on the basis of the information recorded on the optical disc, and moving all of the data on a brand-new medium without any loss of the user data. In FIG. 7, its procedure is put together. First, a configuration of the optical disc to be used will be described with reference to FIG. 8. An optical disc 110 includes a user data area 111 and a management area 112. The management area 112 includes areas of a DI (disc information) 114, defect management information 115, and a trial recording area 116. In particular, information specific to the optical disc is recorded in the DI 114. The optical disc 110 is identical with the optical disc 12 used in the first embodiment. Information related to the above-mentioned recorded waveforms A, B, C, and D are also recorded on the DI 114 as the suggested recorded waveform and the recorded waveform for the particular pattern signal in addition to identification information on the optical disc 110. The detailed information on the DI 114 is put together in FIG. 9. The identification information on the optical disc 110 is mainly stored in medium specific information. The information related to the recorded waveforms of the signals of the respective particular patterns is recorded in recording power information and recording pulse information as recorded waveform setting parameter values. Also, information related to the suggested waveform in the optical disc, and the lifetime of the recorded signal of each particular pattern is also recorded therein (FIG. 10).

The recorded waveform and the recording power are actually determined by the optical disc device with the above optical disc. First, in Step S701, the optical disc device reads a management area of the optical disc, and acquires DI information. The type of the optical disc and the recording/read conditions are confirmed according to the acquired information, and the optical disc device is adjusted according to the conditions matching the optical disc. In this situation, because the lifetimes of the respective recorded signals, and the deterioration-rate ratios of the respective particular patterns to the user data are clarified in advance, there is no need to record all of the particular patterns, and the particular pattern may be selected from the recorded waveforms prepared in advance. For example, when the degree of deterioration and the lifetime of the user data are to be estimated in a short time, one of the particular patterns highest in the deterioration rate can be selected. Also, for example, when the evaluation time is to be reduced at a maximum, one of the plurality of particular pattern recorded waveforms may be selected. Further, for example, when a time when the user data is moved to the brand-new medium is to be determined with high precision, at least two or more different particular patterns may be selected. Then, in Step S702, the optical disc device determines and generates the suggested recorded waveform and the particular pattern recorded waveform on the basis of the acquired information. In this situation, in order to correct the sensitivity variation and the recording power displacement of the optical disc, the optical disc device may conduct OPC, and adjust the recorded waveform. In the above processing, the determination of the recorded waveform is completed, and if recording is conducted, a flow proceeds to the recording operation in Step S703. In this example, it is preferable that the signal to be recorded is recorded in an area where the quality is most remarkably deteriorated. For example, the signal is recorded on an outer peripheral side. On the other hand, if the deterioration is remarkable in an area on an inner peripheral side of the optical disc, the signal may be recorded on the inner peripheral side of the disc. It is needless to say that the signal may be recorded on both of the inner peripheral side and the outer peripheral side. Also, for example, the signal quality is evenly deteriorated over the overall surface of the disc, the signal may be recorded in the user data area.

In Step S704, the signals of the particular pattern recorded in a given area are reading at given intervals to measure the signal quality of the particular pattern. The evaluation intervals may be implemented when reproducing the optical disc. However, when it takes time to conduct the read evaluation if the evaluation is conducted each time, or when the read interval is as long as several years, the signal quality may be too deteriorated to lose the data. Under the circumstance, an evaluation time may be determined in advance. For example, if it is known that the lifetime of the recorded signal of the user data is 100 years in advance, the signal quality may be checked every 10 years.

In Step S705, the amount of deterioration and the lifetime arrival time of the user data are estimated according to the amount of deterioration and a lifetime arrival time of the particular pattern. On the basis of the estimation results, in Step S706, in order to move the data to the brand-new optical disc without any loss of the user data, a method for processing the user data is determined. The processing of the user data is actually implemented according to a procedure of FIG. 7. As the method for moving the data to the brand-new optical disc without any loss of the user data, the degree of deterioration of the user data at that time is estimated, or the lifetime is estimated according to the amount of deterioration of the particular pattern. On the basis of the results, a read evaluation start time and a user data movement time for all of the user data are determined. For example, when the temporal deterioration of the signal quality of the medium on which the data has been stored is confirmed, and the data loss is prevented, the processing is implemented as follows.

The particular pattern signals A, B, C, and D are recorded on the above-mentioned optical disc, with the use of the recorded waveform A, the recorded waveform B, the recorded waveform C, and the recorded waveform D described above as the recorded waveforms of the particular pattern. In this embodiment, the lifetime of data is set as SER=4.2E−3. When the signal quality of the particular pattern B which is the recorded signal having the lifetime arrival time earlier than a reference lifetime of the user data arrives at SER=4.2E−3, the read evaluation of all the user data starts. If a signal worst in the quality in the user data arrives at SER=4.2E−3, the user data is moved to the brand-new medium. With this processing, the data can be moved to the brand-new medium without any loss of the data. Also, if the elapsed time is shorter than the lifetime of the optical disc, the disc evaluation is not implemented. If a real time comes close to the lifetime, the quality evaluation of the user data can start with high frequency, as a result of which a load on the system can be remarkably reduced.

Figure 11:
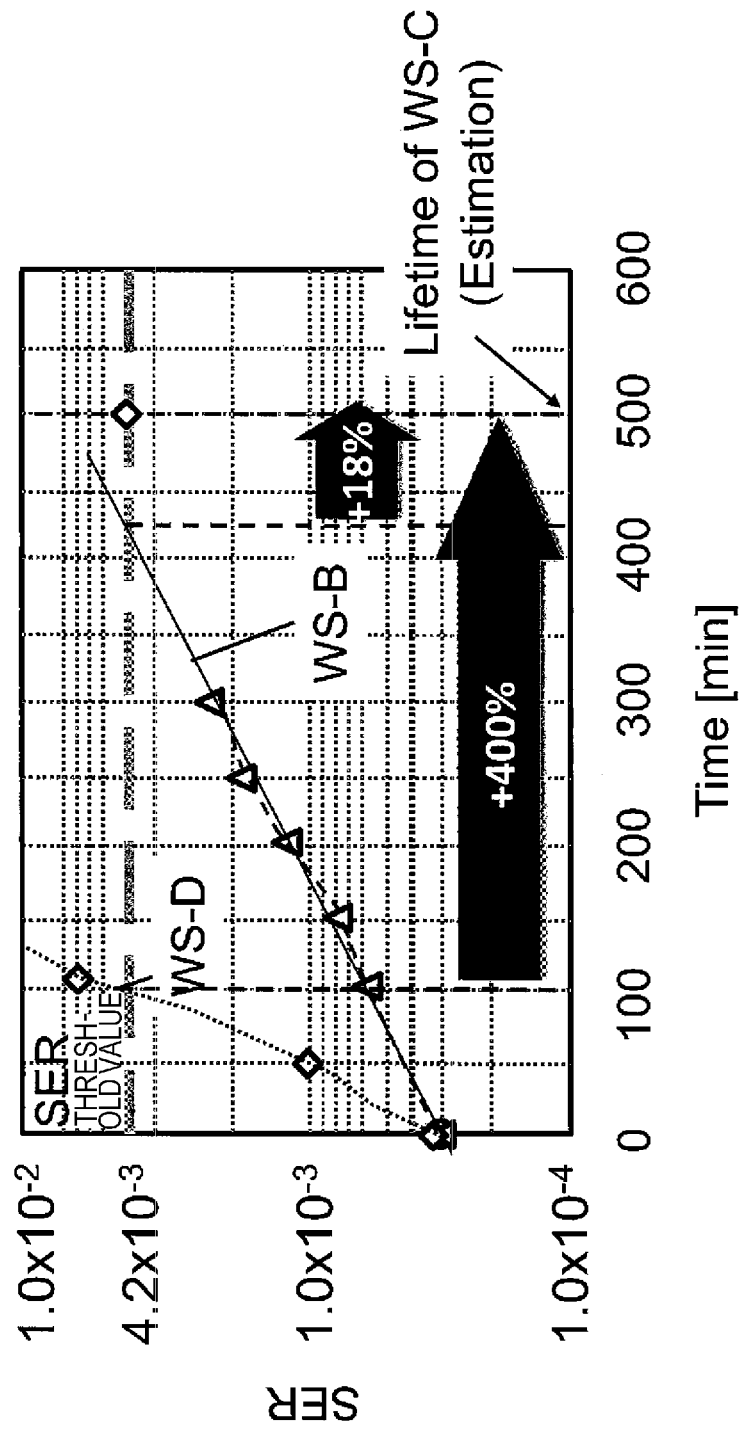
FIG. 11 is an exemplary diagram illustrating a lifetime estimation of suggested recorded waveforms by estimating the amount of deterioration of the user data from the amount of deterioration of the particular pattern signal, and linearly approximating a relationship between an elapsed time and a logarithmic value of an SER.

The method in which the read evaluation is implemented on all of the user data from a time point when the signal of the particular pattern closest to the lifetime of the user data arrives at the lifetime, and the user data is moved to the brand-new medium on the basis of the evaluation value has been described above. The present invention is not limited to this method, but applicable to a method in which the lifetime of the user data is estimated according to the amount of deterioration of the particular pattern with the use of the lifetime ratio of the particular pattern signal to the user data, and a deterioration acceleration factor, and the user data is moved to the brand-new medium at a time point when the real time arrives at the estimated lifetime. The use of this method can cope with a change in the lifetime of the user data caused by changing the environment of the disc storage unit 11 as needed. FIG. 11 illustrates an example of the results of estimating the lifetime of the user data according to the lifetime and the amount of deterioration of the particular pattern signal by implementing the constant-temperature oven acceleration test. Because a temperature of this acceleration test is set to be higher than that in the case of FIG. 1, the deterioration of the recorded signal is promoted. The particular pattern signal (WS-D) according to this embodiment has a lifetime at a point crossing a threshold value (SER=4.2E−3) of the signal quality. On the other hand, in the particular pattern signal (WS-B) that does not arrive at the lifetime, a relationship between the elapsed time and a logarithmic value of the SER is linearly approximated, and a time at which the linearly approximated relationship arrives at a threshold value (SER=4.2E−3) of the signal quality is determined as the lifetime. For example, since SER becomes SER=4.2E−3 at 100 min when WS-D is used as the base, 100 min is multiplied by 5 which is a given factor for calculating the lifetime of WS-C into 500 min. This corresponds to +400% because 500 min is obtained with reference to 100 min. Also, when WS-B is used as the base, it can be estimated that SER first becomes SER=4.2E−3 at 425 min by extrapolation. Further, 425 min is multiplied by 1.18 which is a given factor for calculating the lifetime of WS-C into 502 min. This corresponds to +18%. On the basis of those calculation results, the lifetime of the user data can be estimated to specify an available period of the optical disc, and the user data can be moved to the brand-new medium without any loss of the user data. In fact, as a result of implementing the read evaluation on all of the user data, it is confirmed that there is no user data that arrives at the lifetime.

As described above, according to this embodiment, when the user data is recorded in the data area, the signal of the particular pattern faster in the deterioration is recorded in the trial recording area or the user area in advance. As a result, the temporal deterioration of the quality of the user data can be estimated in a short time, and also the lifetime of the user data can be clarified. The data can be moved to the brand-new medium without any loss of the data. Also, because there is no need to evaluate all of the user data, a load on the system can be remarkably reduced. The method according to this embodiment is preferable in a case where after the data has been recorded on the optical disc, the data is stored as it is for a long period of time.

The above procedure is the main configuration of the method for evaluating the signal quality, the procedure thereof, and the system having the optical disc and the optical archive device.

This embodiment exemplifies the optical disc of BDXL™ standard. However, it is apparent that the present invention can be executed on the R-type and the RE-type of BD, DVD, and CD. Also, the contents described in this embodiment such as the method for estimating the lifetime by extrapolation can be applied to the following embodiments, likewise.

Second Embodiment

In this embodiment, a method for determining the recorded waveform recorded on the optical disc will be described. Parts not changed are identical with those in the first embodiment, and therefore will be omitted in this embodiment.

Figure 12:
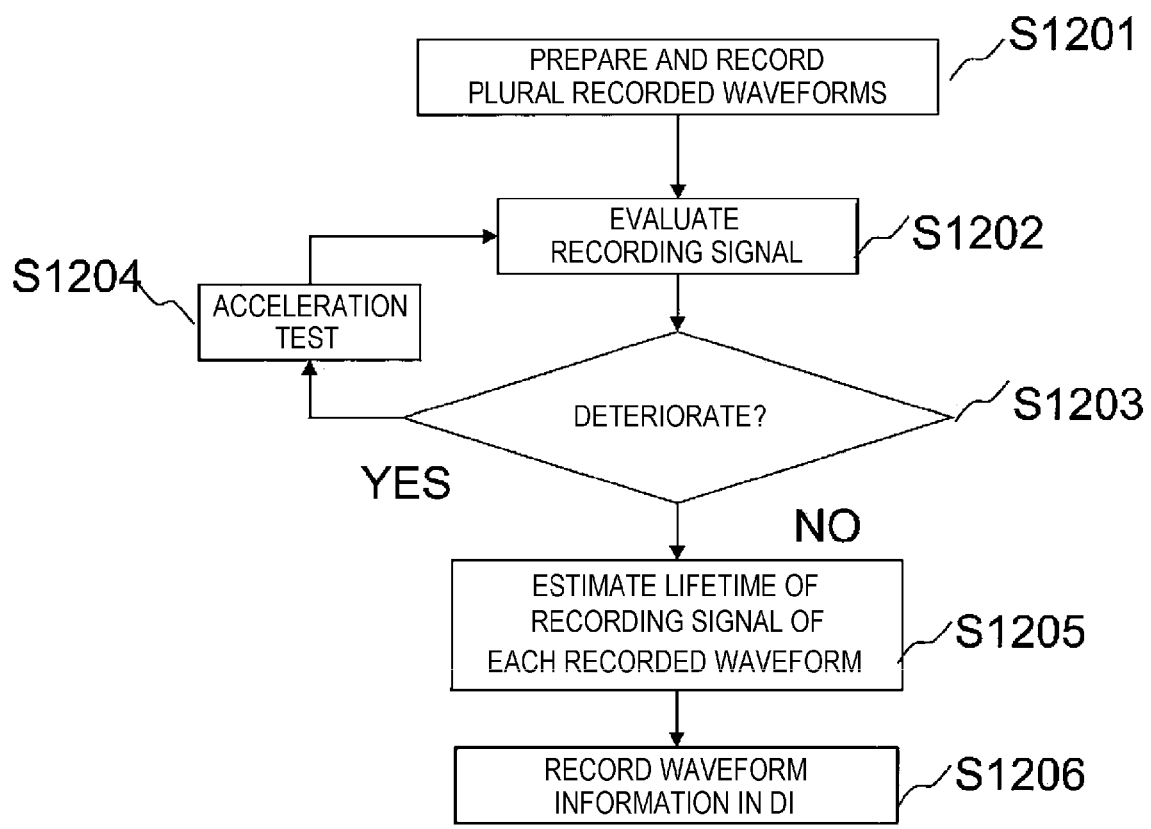
FIG. 12 is an exemplary flowchart illustrating a procedure of a method for determining the particular pattern signal to record the signal on the optical disc.

In Step S1201 of FIG. 12, plural kinds of recorded waveforms are first prepared, and recorded at given positions on the optical disc. However, the recorded area of the particular pattern is not limited to only the trial recording areas on the inner peripheral side and the outer peripheral side described above, but the particular pattern may be recorded in the user data area. As a result, this embodiment can cope with a difference in the deterioration rates and tendency of the signal quality in the inner periphery, the intermediate periphery, and the outer periphery of the optical disc 12, and the temporal deterioration and the lifetime of the user data can be appropriately estimated.

Figure 13:
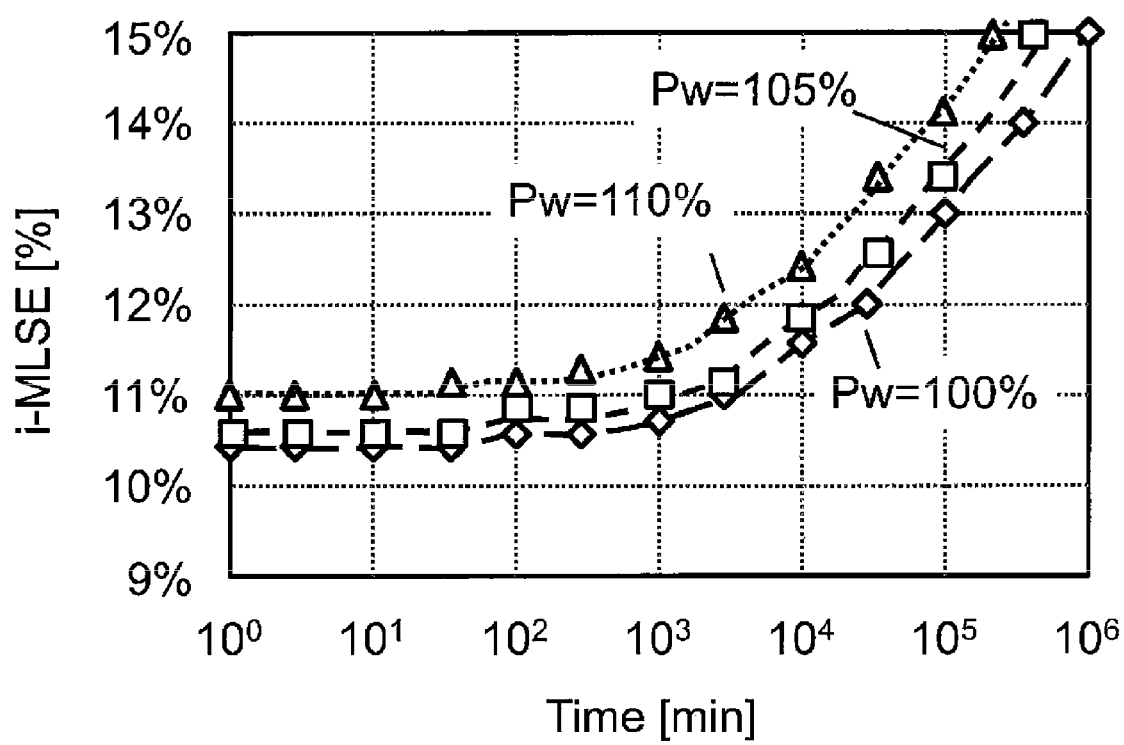
FIG. 13 is an exemplary diagram illustrating results of measuring a change in i-MLSE with time through the constant-temperature oven acceleration test, in the suggested recorded waveform C taking a medium sensitivity variation and a recording power displacement into account.
Figure 14:
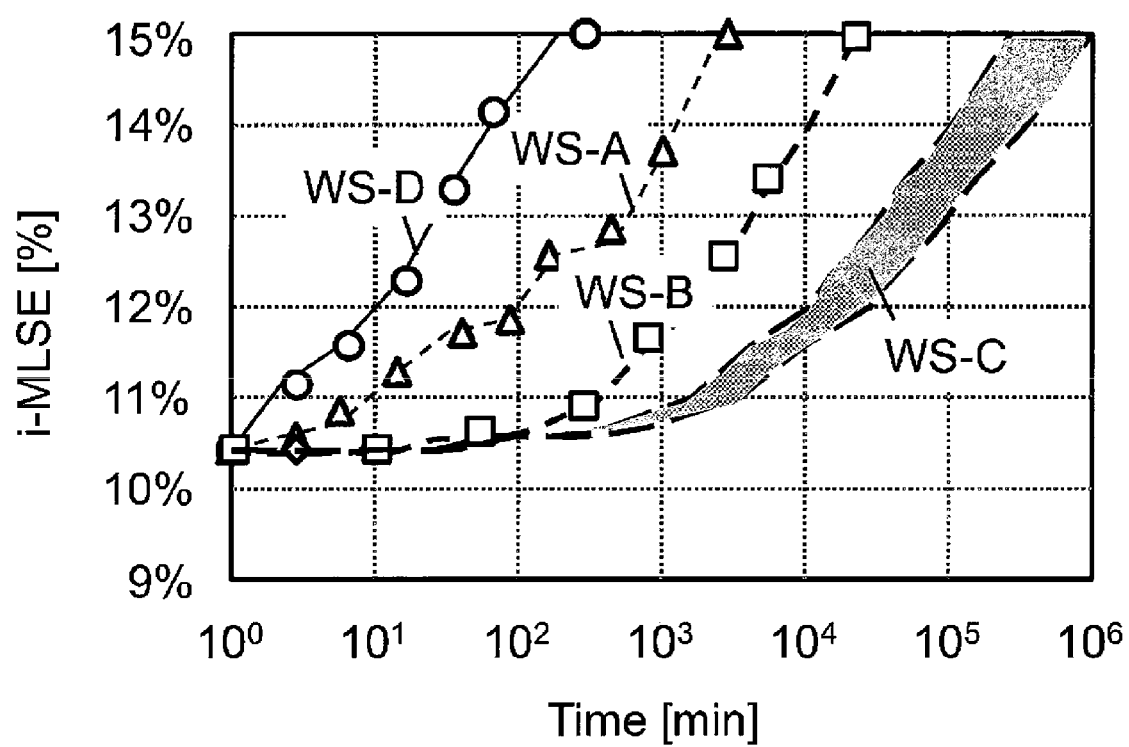
FIG. 14 is an exemplary diagram illustrating results of measuring a change in i-MLSE with time through the constant-temperature oven acceleration test, in recorded signals of the recorded waveform A, the recorded waveform B, the recorded waveform C, and a recorded waveform D.

In Step S1202, the recorded signal is reading to measure the signal quality. In subsequent Step S1203, it is determined whether the recorded signal is deteriorated, or not, for determination of the particular pattern signal. If the recorded signal is deteriorated, an acceleration test is implemented in Step S1204. In determination of the signal of the particular pattern, in order to calculate the lifetime and the deterioration-rate ratio of the user data and the signal of the particular pattern recorded on the above-mentioned optical disc 12, the constant-temperature oven acceleration test is implemented. FIGS. 13 and 14 both illustrate the deterioration characteristics of the respective recorded signals. In this example, because the temperature of this acceleration test is set to be higher than that in FIG. 1, the deterioration of the recorded signal is promoted. FIG. 13 illustrates the deterioration characteristics in the recorded waveform of the suggested recorded waveform C taking a medium sensitivity variation and a recording power displacement of the optical disc into account. Assuming that the medium sensitivity difference of the optical disc is about 10%, the deterioration characteristics of the recorded signals of the suggested recording power and ±10% of the suggested recording power are compared with each other. When the recording power is changed to be larger, the lifetime of the recorded signal has a tendency to be shortened as compared with the recording power 100%. From this fact, it is understood that even when the signal is recorded with the suggested waveform, the lifetime is not uniquely determined, and has the distribution. As a result of calculating the lifetime (time at which i-MLSE arrives at 14%) in standard storage conditions (25° C./60% RH) on the basis of the results of this acceleration test, real lifetimes of the respective recorded signals are calculated as 120 years in Pw=100%, about 110 years in Pw=105%, and 100 years in Pw=110%. In this case, the recording power is increased to compare the deterioration characteristics with each other. However, even if the recording power is small, it is conceivable that the lifetime of the recorded signal has a tendency to be shortened, likewise. In Step S1204, the signal quality is measured on the recorded signal subjected to the acceleration test, and in Step S1203, it is determined whether the acceleration test is continued, or not. The above acceleration test and the quality evaluation of the recorded signal are repeated, and if it is determined that the deterioration of the respective recorded signals is sufficient until the deterioration rate and the lifetime can be calculated, the processing proceeds to Step S1205 from Step S1203, and the signal of the particular pattern is determined on the basis of the lifetimes of the respective recorded signals. However, the recorded signal evaluation is not limited to only the lifetime, but the recorded signal may be evaluated by a change in the amount of deterioration to a time of the signal quality, or the combination of the signal quality immediately after recording, and the deterioration rate of the signal quality. The determination of whether the deterioration of the recorded signal in Step S1205 is sufficient, or not, is conducted on the basis of whether an acceleration test time, the quality of the recorded signal, the modulation degree, a mark size, jitter, asymmetry, or β arrives at a given threshold value, or whether an increment thereof arrives at a given threshold value, or not.

FIG. 14 illustrates the results of comparing the deterioration characteristics of the recorded signals of the respective recorded waveforms with each other. It is found that the recorded signal of the suggested recorded waveform C is lowest in the deterioration rate among all of the recorded signals, and longest in the lifetime. The recorded waveform B is second lowest in the deterioration rate, and second longest in the lifetime. The recorded waveform A and the recorded waveform D are subsequent to the recorded waveform B. Like the above, as a result of calculating the lifetime (time at which i-MLSE arrives at 14%) in the standard storage conditions (25° C./60% RH) on the basis of the results of this acceleration test, real lifetimes of the respective recorded signals are calculated to be about 100 years in the recorded waveform C, about 85 years in the recorded waveform B, 60 years in the recorded waveform A, and about 20 years in the recorded waveform D. In this case, the lifetime ratio of the signals of the respective particular patterns is 12:17:20:4 in the recorded waveform A:recorded waveform B:recorded waveform C:recorded waveform D, respectively. From the above results, the recorded signal earlier in the lifetime arrival time than the reference lifetime of the user data is selected as the particular pattern. In this situation, as with the first embodiment, the reference lifetime may be set, for example, as the intermediate value of the lifetime distribution. Further, in order to improve the reliability, the reference lifetime may be set, for example, as a time of 2σ of a user data lifetime distribution in which data of at least 95 optical discs among 100 optical discs on which the user data has been recorded is not lost. More preferably, the reference lifetime may use a time of 3σ of the user data lifetime distribution in which data of at least 99 optical discs among 100 optical discs on which the user data has been recorded is not lost. As the method of the acceleration test in calculating the lifetime ratio of the signals of the respective particular patterns, there is a reading light acceleration test in addition to the above-mentioned constant-temperature oven acceleration test. The reading light acceleration test is an acceleration test method that continues to read the recorded signal with a read power higher than normal, and exposes the recording film to a high temperature to promote the temporal deterioration of the recorded signal. In this method, because only the recording film of the optical disc can be selectively heated, a stress higher than that of the constant-temperature oven acceleration test can be applied onto the recording film, and the temporal deterioration of the recorded signal can be reading in a short time as compared with the constant-temperature oven acceleration test. The detail will be described in a fourth embodiment.

According to a procedure of FIG. 12, information related to the recorded waveforms of the signals of the respective particular patterns determined in Step S1205 records the suggested recorded waveform and the recorded waveform information for the particular pattern signal in the management area 112 of the optical disc 110. The information related to the recorded waveforms of the respective signals is recorded in the recording power information and the recording pulse information as the recorded waveform setting parameter values.

The method according to this embodiment is also applicable to other embodiments, and the same advantages are obtained in the respective embodiments.

Third Embodiment

In this embodiment, a description will be given of a method in which the optical disc device determines the recorded waveform when the recorded waveform is not recorded on the optical disc. Parts not changed are identical with those in the first and second embodiments, and therefore will be omitted in this embodiment.

Figure 15:
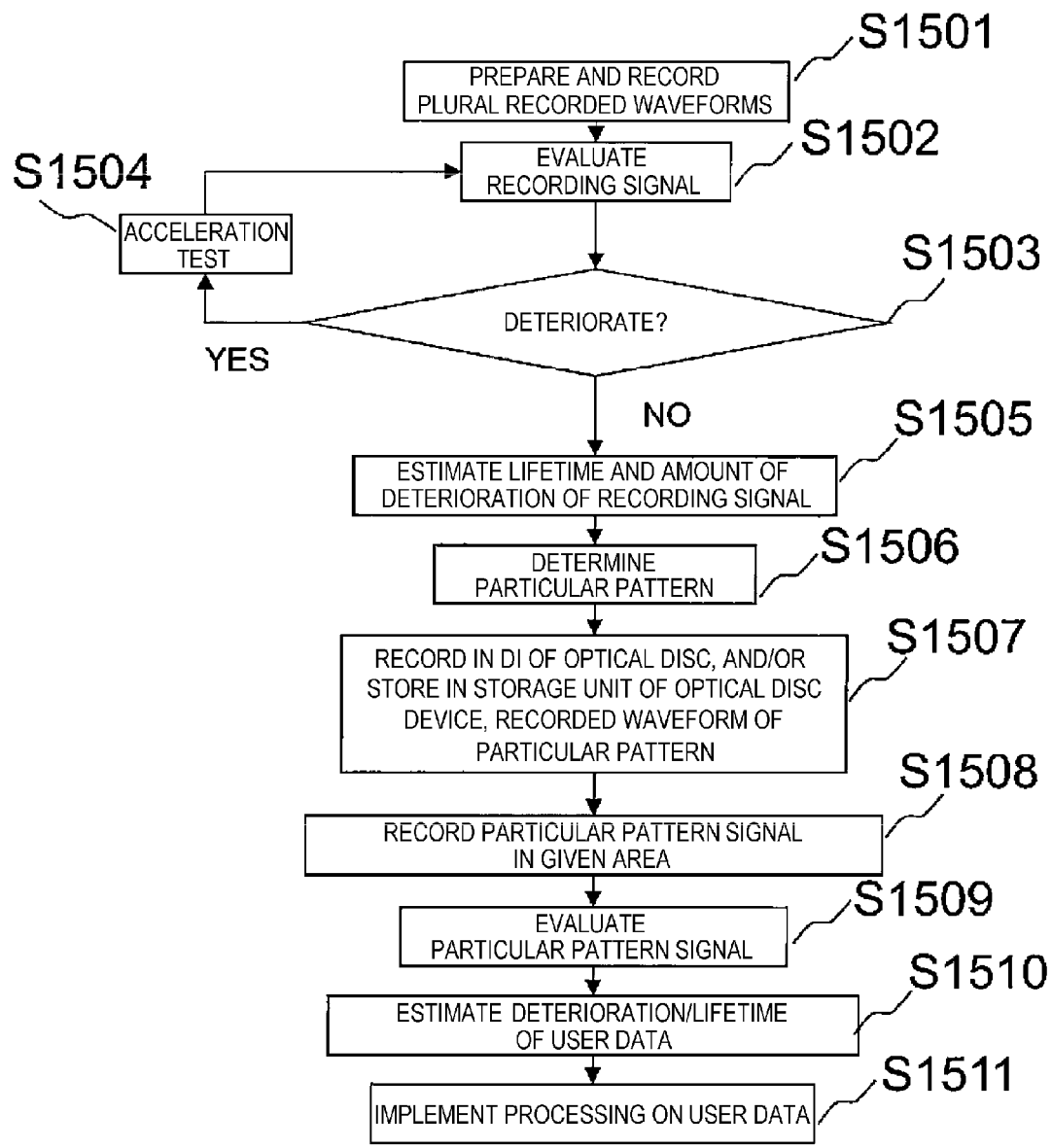
FIG. 15 is an exemplary flowchart illustrating a procedure of a method for determining the recorded waveform of the particular pattern to evaluate the quality of the recorded signal by an optical disc device, related to the determination of a method for moving data to a brand-new optical disc without any loss of user data.

In the first embodiment, the recorded waveform is acquired from the optical disc. If the recorded waveform of the particular pattern is not recorded on the optical disc, the optical disc device may determine the recorded waveform according to a flowchart of FIG. 15. In this case, the optical disc device may determine the recorded waveform similarly to the second embodiment. In this case, if the recorded waveform generated by the optical disc device is recorded on the optical disc, or stored in the optical disc device, the data can be moved to a brand-new optical disc without any loss of the user data through the procedure of this embodiment in recording the optical disc next. Also, when the optical disc device stores the recorded waveform of the particular pattern therein, the recorded waveform read from the optical disc device may be used.

The method according to this embodiment is also applicable to other embodiments, and the same advantages are obtained in the respective embodiments.

Fourth Embodiment

In this embodiment, a description will be given of a case in which the recording conditions are changed in the signals of the particular pattern according to the first embodiment. Parts not changed are identical with those in the first to third embodiments, and therefore will be omitted in this embodiment.

FIG. 16 is a diagram illustrating an example of the signal of the particular pattern used in the recording quality evaluation method. The signal of the particular pattern earlier in the lifetime arrival time than the user data recorded at the given places of the optical disc in FIGS. 5A and 5B is not limited to the recorded signal identical in the signal quality immediately after recording, but different in the modulation degree. For example, the signal of the particular pattern may be a signal changed in the asymmetry or the β value immediately after recording. In this method, the modulation degree of the signal immediately after recording the respective recorded waveforms is kept constant, and only the asymmetry and the β value are changed. For example, in this embodiment, the β value is changed in increments of 3%. In this case, because a mark size of the longest mark length immediately after recording is identical in all of the recorded waveforms, it is conceivable that in the optical disc having a feature that the recording mark size is changed with the temporal deterioration, a difference in a balance difference of a signal level between the shorter marks and the longer marks can be detected with high sensitivity.

As in the second embodiment, in determination of the signal of the particular pattern, in order to calculate the lifetime and the deterioration-rate ratio of the user data and the signal of the particular pattern recorded on the above-mentioned optical disc 12, the constant-temperature oven acceleration test is implemented.

Figure 17:
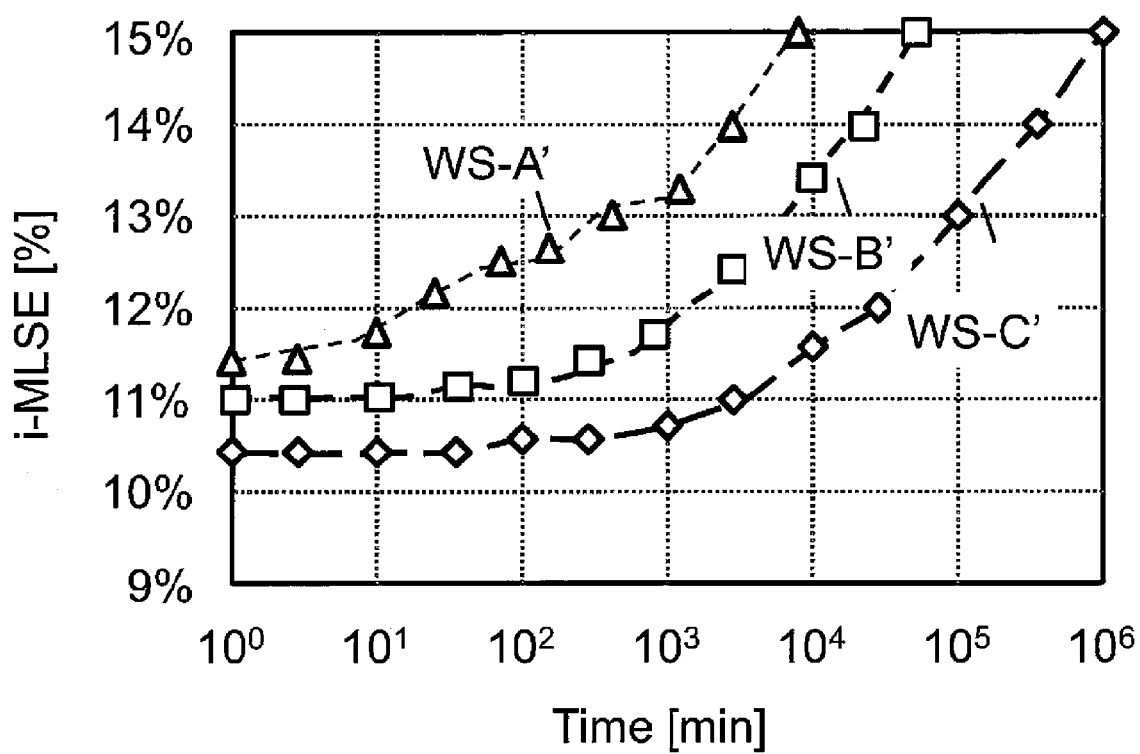
FIG. 17 is an exemplary diagram illustrating results of measuring a change in i-MLSE with time through the constant-temperature oven acceleration test, in recorded signals of a recorded waveform A', a recorded waveform B', a recorded waveform C', and a recorded waveform D'.

FIG. 17 illustrates the results of comparing the deterioration characteristics of the recorded signals of the respective recorded waveforms with each other. It is found that the recorded signal of the suggested recorded waveform C is lowest in the deterioration rate among all of the recorded signals, and longest in the lifetime. The recorded waveform B is second lowest in the deterioration rate, and second longest in the lifetime. The recorded waveform A is subsequent to the recorded waveform B. As in the second embodiment, as a result of calculating the lifetime (time at which i-MLSE arrives at 140) in the standard storage conditions (25° C./60% RH) on the basis of the results of this acceleration test, real lifetimes of the respective recorded signals are calculated to be about 100 years in the recorded waveform C, about 75 years in the recorded waveform B, and 50 years in the recorded waveform A. The lifetime ratio is calculated on the basis of the lifetime of the signals of the respective particular patterns. In this embodiment, the lifetime ratio of the recorded waveform A:recorded waveform B:recorded waveform C is calculated as 2:3:4, respectively. In this example, the lifetime ratio is calculated. Alternatively, an acceleration coefficient to the user data may be calculated. From the above results, the method for determining the signal of the particular pattern is to select the particular pattern earlier in the lifetime arrival time than the reference lifetime of the user data. In this situation, as with the other embodiments, the reference lifetime may be set, for example, as the intermediate value of the lifetime distribution. Further, in order to improve the reliability, the reference lifetime may be set, for example, as a time of $2\sigma$ of a user data lifetime distribution in which data of at least 95 optical discs among 100 optical discs on which the user data has been recorded is not lost. More preferably, the reference lifetime may use a time of $3\sigma$ of the user data lifetime distribution in which data of at least 99 optical discs among 100 optical discs on which the user data has been recorded is not lost.

With the use of the signal of the particular pattern thus determined, the temporal deterioration of the quality of the user data can be estimated in a short time according to the steps of FIG. 7 as in the first embodiment, and the lifetime of the user data can be clarified. The data can be moved to the brand-new medium without any loss of the data. The method according to this embodiment is preferable in a case where after the data has been recorded on the optical disc, the data is stored as it is for a long period of time.

The method according to this embodiment is also applicable to the other embodiments, and the same advantages as those in the respective embodiments are obtained.

Fifth Embodiment

In this embodiment, a case in which the acceleration test method is changed in the determination of the signal of the particular pattern according to the second embodiment will be described. Parts not changed are identical with those in the first to fourth embodiments, and therefore will be omitted in this embodiment.

The acceleration test method is not limited to the constant-temperature oven acceleration test, but may use, for example, the reading light acceleration test using the reading light. The reading light acceleration test is a technique that continues to read the signal with the use of the reading power higher than normal, and deteriorates the recorded signal. In this method, because only the recoding film is directly heated unlike the constant-temperature oven acceleration test, the acceleration test is conducted at a temperature higher than the constant-temperature oven acceleration. For that reason, the reading light acceleration test is a technique that can deteriorate the recorded signal in a shorter time than that of the constant-temperature oven acceleration test.

In the reading light acceleration test, a reading power Pr to be used is set according to a given condition. For example, a reading power Pr (1) of the optical disc stored in the optical disc device, or a suggested reading power Pr (2) determined by standards is read, and the reading power is set to be higher than the Pr (1) or the Pr (2). Alternatively, a reading power Pr (3) recorded on the optical disc is read, and the reading power is set to be higher than the Pr (3). In the reproducing operation, the laser may conduct DC light emission, or light emission superposed with a high frequency. When the light emission is conducted with the high frequency superposition, the recorded signal could be deteriorated in a shorter time than that of the DC light emission. Because the deterioration of the recorded signal is more promoted as the reading power is set to be higher, the acceleration test is shortened. However, if the production power is set to be too high, the deterioration mode of the recording film may be different, or a material other than the recording film may be deteriorated. For that reason, the reading power used in the reading light acceleration test needs to be set in a range not different from the deterioration mode in the constant-temperature oven acceleration test. As a result of implementing the reading light acceleration test with the reading speed 2× and the reading power 2.0 mW on the optical disc used in this embodiment in advance, the deterioration of a substrate which is not generated in the constant-temperature oven acceleration test is observed. On the other hand, as a result of implementing the reading light acceleration test with the reading speed 2× and the reading power 1.7 mW on the optical disc, the deterioration different from normal deterioration is not generated, and the same deterioration of the recorded signal as that in the constant-temperature oven acceleration test can be confirmed. Under the circumstance, in this embodiment, the reading speed 2× and the reading power 1.7 mW is set as the acceleration conditions of the reading light acceleration test. In this example, when the deterioration is extremely fast, or extremely slow under the set acceleration conditions, the acceleration conditions may be changed.

A time of the reading light acceleration test in Step S1204 of FIG. 12 is managed by, for example, a given number of reads or a reading time. In this embodiment, the reading light acceleration test is managed by the time, and the respective acceleration test is conducted for about 5 minutes (about 830 in the number of reads). Also, whether to continue the acceleration test in Step S1203, or not, is determined according to whether, for example, an edge fluctuation amount of the recorded signal, the signal quality, L-SEAT jitter, L-SEAT shift, β, or asymmetry reaches a given value, or a given variation, or not. In this embodiment, the determination is conducted according to whether the variation of i-MLSE reaches 5%, or not, in this embodiment.

Figure 18:
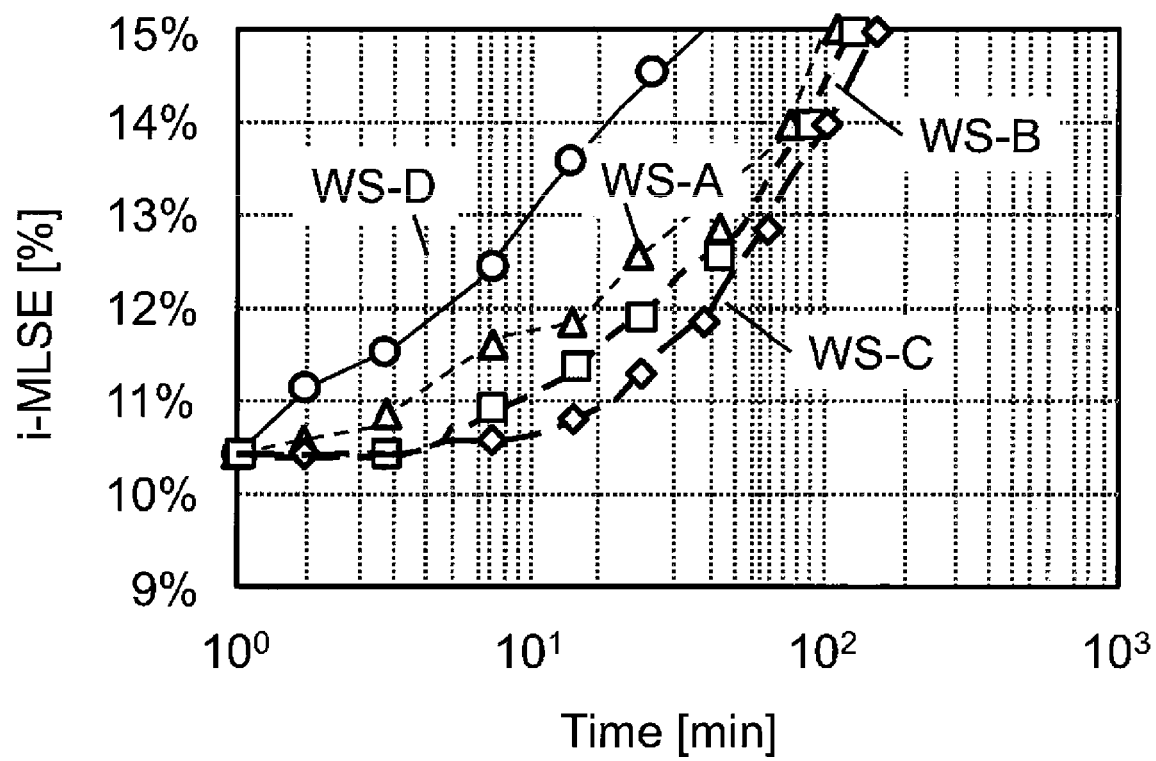
FIG. 18 is an exemplary diagram illustrating results of measuring a change in i-MLSE with time through a reading light acceleration test, in the recorded signals of the recorded waveform A, the recorded waveform B, the recorded waveform C, and the recorded waveform D.

In fact, the reading light acceleration test is implemented in Step S1204, according to the procedure in FIG. 12 in the optical disc according to the second embodiment. As an example of the deterioration of the recorded signal by the reading light acceleration test, FIG. 18 illustrates a change in the i-MLSE of the recorded signals of the recorded waveform A, the recorded waveform B, and the recorded waveform D. Because i-MLSE reaches 14.0% at the time when an accumulated time of the reading light acceleration test arrives at 20 minutes in the recorded signal of the recorded waveform D, 75 minutes in the recorded signal of the recorded waveform A, and 85 minutes in the recorded signal of the recorded waveform B, the acceleration test is determined as completion. After the acceleration test has been completed for the recorded signals of all the recorded waveforms, the recorded signals of the recorded waveform A, the recorded waveform B, and the recorded waveform D in FIG. 18 are shorter in the lifetime than the recorded signal of the recorded waveform C taking the medium sensitivity unevenness into account in Step S1205, the recorded signals of the recorded waveform A, the recorded waveform B, and the recorded waveform D are determined as the signals of the particular pattern.

Since this result is identical with that in the first embodiment, it is confirmed that the recorded waveform that suitably suppresses the deterioration of the recorded signal can be determined even by the use of the reading light acceleration test. The particular patterns thus selected are recorded at the given positions of the optical disc, the reading evaluation is conducted at the given time intervals, and the method of processing the user data is determined on the basis of the evaluation results. As the processing method, the degree of deterioration of the user data at that time can be estimated from the amount of deterioration of the particular pattern, or the lifetime can be clarified. As a result, because the reading evaluation start time for all of the user data can be determined, and the user data movement time can be determined, the data can be moved to the brand-new medium without any loss of the data.

The method according to this embodiment is also applicable to the other embodiments, and the same advantages as those in the respective embodiments are obtained.

Sixth Embodiment

In this embodiment, a description will be given of a case in which a method of ranking the optical disc media stored in the disc storage unit 11 according to the first embodiment in FIG. 3 is implemented. Parts not changed are identical with those in the first to fifth embodiments, and therefore will be omitted in this embodiment.

In this embodiment, a description will be given of the results of ranking the qualities of the optical disc on which the user data has been recorded at a time point when the elapsed time is much shorter than the lifetime, with the use of the particular pattern recorded signal higher in the sensitivity to the stress than the recorded signal of the user data.

In this embodiment, like the other embodiments, the signal of the particular pattern faster in the deterioration than the user data is recorded in recording the user data. For example, the signal of the particular pattern is a recorded signal that arrives at the end of the lifetime before the reference lifetime of the lifetime distribution of the user data in FIGS. 5A and 5B. In this example, the reference lifetime may be set to an intermediate value of the lifetime distribution as described above. However, in this embodiment, since the high sensitivity to the stress is required, it is preferable that the time of $3\sigma$ of the user data lifetime distribution is set as the reference lifetime. The particular pattern signals different in recorded signal level with the adjustment of the recorded waveform and the recording power are prepared.

Figure 19:
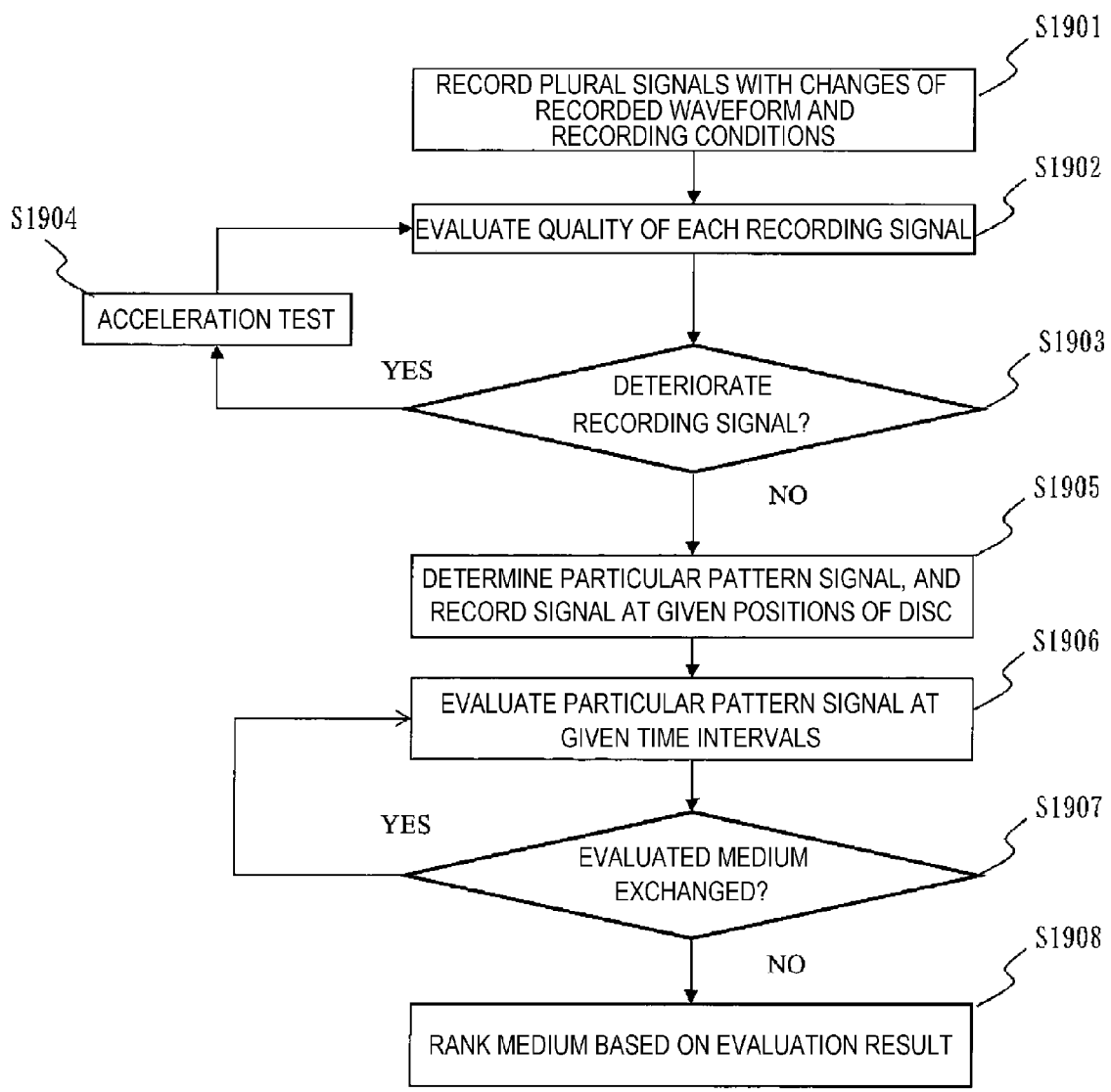
FIG. 19 is an exemplary flowchart illustrating a procedure of a method for ranking media, related to the determination of the method for ranking the media, in the media intended for the archive.

The above-mentioned ranking procedure is put together in FIG. 19. In Step S1901 of FIG. 19, plural kinds of recorded waveforms are first prepared, and a given signal is recorded in the respective recorded waveforms. In Step S1902, the recorded signal is reading to measure the signal quality from the reading signal. In subsequent Step S1903, it is determined whether the recorded signal is deteriorated, or not, for determination of the particular pattern signal. If the recorded signal is deteriorated, an acceleration test is implemented (Step S1904). In Step S1904, the signal quality is measured with respect to the recorded signals subjected to the acceleration test, and in Step S1903, it is determined whether the acceleration test is continued, or not. The above acceleration test and the quality evaluation of the recorded signals are repeated, and if it is determined that the deterioration of the respective recorded signals is sufficient until the deterioration rate to the user data and the lifetime can be calculated, the processing proceeds to Step S1905 from Step S1903, and the signals of the particular pattern is determined on the basis of the lifetimes of the respective recorded signals. However, the recorded signal evaluation is not limited to only the lifetime, but the recorded signals may be evaluated by a rate of the increase in the amount of deterioration of the signal quality, or the combination of the signal quality immediately after recording, and the deterioration rate of the signal quality. The determination of whether the deterioration of the recorded signals in Step S1905 is sufficient, or not, is conducted on the basis of whether an acceleration test time, the quality of the recorded signals, reflectance, the modulation degree, a mark size, jitter, asymmetry, or 13 arrives at a given threshold value, or whether an increment thereof arrives at a given threshold value, or not. According to the procedure of FIG. 19, the signals of the particular patterns determined in Step S1905 are recorded at given positions of the disc. A given area to be recorded is not limited to the trial recording area in the outer periphery of the inner peripheral side and/or the outer peripheral side, but may be in the data area. In Step S1906, the signals of the particular patterns recorded in the given area are reading at the given intervals to measure the quality of the signals of the particular pattern. For example, if it is known that the lifetime of the user data is 100 years in advance, the quality may be checked every 10 years.

In Step S1907, it is determined whether the evaluation medium is exchanged to another for quality comparison between the media, and if exchanged, a control signal is fed from the timing control unit 33 for periodic inspection in the personal computer (PC) unit of FIG. 3 to the disc transport controller 14 of the disc transport/storage unit 10, the optical disc 12 installed on the disc installation unit 13 is transported to the disc storage unit 11, and the instructed optical disc is extracted from the disc storage unit 11, and installed on the disc installation unit 13. After installation, the signal quality is evaluated as with the optical disc mentioned above. The evaluation results are stored in the storage unit of the drive control unit 28 in the drive unit 20. The exchange of the optical disc, and the signal evaluation are repeated, and if the disc evaluation of the number set by the user in advance, and all of the optical discs stored within the archive device have been completed, Step S1908 is moved from Step S1906, and the optical discs stored in the disc storage unit 11 are sorted for each rank on the basis of the evaluation results stored in the drive control unit 28.

Figure 20:
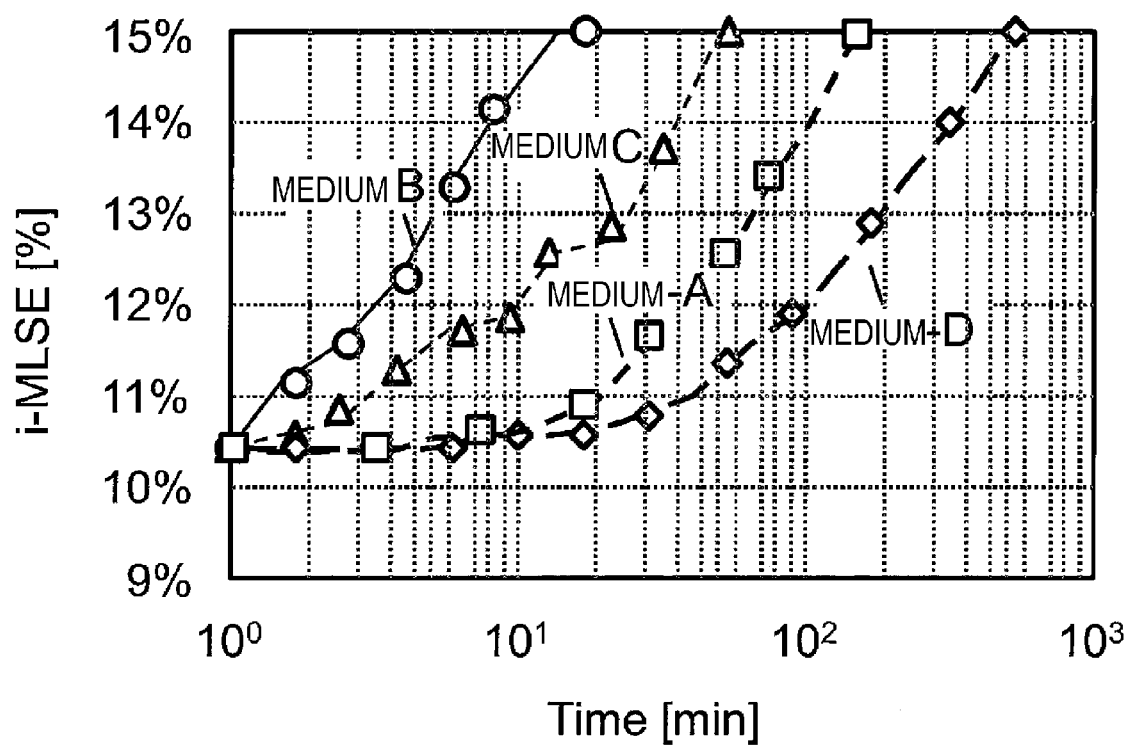
FIG. 20 is an exemplary diagram illustrating results of measuring a change in i-MLSE with time through the reading light acceleration test, in signals recorded on a medium A to a medium D.

According to the procedure of FIG. 19, the optical discs on which the user data have been actually recorded are ranked. For comparing the deterioration rates between the media with the recorded waveform D, the constant-temperature oven acceleration test is implemented. As an example of the deterioration of the recorded signals between the media, FIG. 20 illustrates a change in i-MLSE of the recorded signal of the recorded waveform D. From the evaluation results, the medium D is longest in the lifetime among the medium A, the medium B, the medium C, and the medium D. The medium A is second longest. The medium C and the medium B are subsequent to the medium A. From this result, it is found that the deterioration rate to the stress is different depending on the medium. The media are ranked on the basis of the evaluation results, thereby being capable of adjusting the frequency of the periodic inspection, and reducing a load on the overall system. For example, the periodic inspection period of the medium D best in the quality can be made longer than that of the medium B.

Also, as the method for moving the data to the brand-new disc without any loss of the data for the ranked optical discs, the degree of deterioration of the user data at that time is estimated, or the lifetime is estimated according to the amount of deterioration of the particular pattern. On the basis of this result, the reading evaluation start time and the user data movement time are determined for all of the user data. For example, the temporal deterioration of the signal quality of the medium on which the data has been stored is confirmed, and if the data lost is prevented, the following processing is implemented.

The method according to this embodiment is also applicable to the other embodiments, and the same advantages as those in the respective embodiments are obtained.

Seventh Embodiment

In this embodiment, a description will be given of a method of providing the recorded waveform suitable for the optical disc storage conditions of the user. Parts not changed are identical with those in the first to sixth embodiments, and therefore will be omitted in this embodiment.

In this embodiment, a description will be given of a method in which the information related to the deterioration rate and the lifetime of the optical disc in the storage environment of the user is acquired, and the recorded waveform suitable for the storage environment of the optical disc is provided to future customers, with the use of a reference disc and a reference optical disc device in the optical archive device of FIG. 2.

Figure 21:
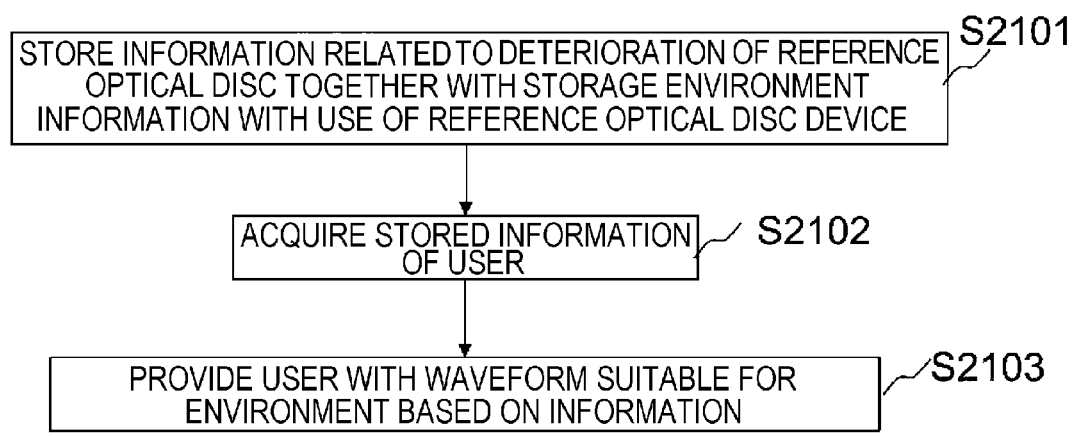
FIG. 21 is an exemplary flowchart illustrating a procedure of a storage management method for providing a recorded waveform suitable for the optical disc storage environment of each user.

A procedure in a method of providing the recorded waveform suitable for the optical disc storage conditions of the user is put together in FIG. 21. First, in Step S2101, the recorded signal of the particular pattern higher in the deterioration rate of a reference optical disc is reading at a given timing to evaluate the recorded signal quality, with the use of the reference optical disc device which is installed within the optical archive device. The evaluation timing may be appropriately executed by the user, or can be automatically executed by the device. In Step S2102, the information related to the evaluated recorded signal quality of the reference disc is acquired from the data acquisition unit together with information related to the storage environments which is measured from a thermometer 6 and a hygrometer 7. A correlation of the deterioration rate, the lifetime, and the storage environment of the recorded signal is studied on the basis of the acquired data. The recorded waveforms suitable for the respective storage environments can be determined on the basis of the study results, and in Step S2103, the recorded waveform suitable for the optical disc storage environment of the user can be provided. For example, if the humidity and temperature during recording are higher than the suggested conditions, countermeasure such that the peak power is reduced by several %, is proposed.

As described above, because the optimal recorded waveforms responsive to the storage status for each user can be selected in addition to the same advantages as those in the first embodiment, there is an advantage that the lifetime can be resultantly lengthened.

What is claimed is:

1. A quality evaluation method comprising:
   irradiating a particular pattern on a recording medium in a plurality of recording media to read a particular pattern signal therefrom, the particular pattern having a lifetime shorter than a reference lifetime of user data recorded in a user data area, the particular pattern recorded outside the user data area;
   evaluating a quality of the particular pattern signal; and
   determining a quality of the user data based on the evaluated quality of the particular pattern signal,
   wherein the reference lifetime is an intermediate value in a user data lifetime distribution that corresponds to a lifetime value for which user data recorded on a percentage of the recording media in the plurality of recording media is preserved.

2. The quality evaluation method according to claim 1, wherein the particular pattern is a pattern recorded by a recorded waveform different in at least any one of an asymmetry, a β value, a recording power, and the degree of modulation, from a recorded waveform of the user data.

3. The quality evaluation method according to claim 1, further comprising: recording the particular pattern on at least any one of an inner peripheral side and an outer peripheral side of the recording medium, in any period between immediately before and immediately after the user data is first recorded on the recording medium.

4. The quality evaluation method according to claim 1, wherein the determining the quality of the user data includes implementing a reading evaluation on the user data when the particular pattern reaches the lifetime.

5. The quality evaluation method according to claim 1, wherein evaluating the quality includes estimating the lifetime of the particular pattern by extrapolation in a relational expression of a time and an index of the quality evaluation obtained from the quality evaluation.

6. The quality evaluation method according to claim 5, further comprising estimating the reference lifetime of the user data on the basis of the lifetime of the particular pattern.

7. The quality evaluation method according to claim 1, further comprising recording the user data on a different recording medium based on the determined quality of the user data.

8. The quality evaluation method according to claim 1, wherein the particular pattern is recorded with a recorded waveform determined by an acceleration test in advance.

9. The quality evaluation method according to claim 8, wherein the acceleration test comprises a constant-temperature oven acceleration test and a reading light acceleration test.

10. The quality evaluation method according to claim 1, wherein a recorded waveform for recording the particular pattern is determined on the basis of at least one of a measured deterioration rate and the lifetime for each of a plurality of the recorded waveforms prepared in advance for the plurality of recording media, and
    wherein the particular pattern of each of the plurality of recording media is recorded with the use of the determined recorded waveform.

11. The quality evaluation method according to claim 10, wherein the qualities of the plurality of recording media are ranked on the basis of the evaluated quality of each of the plurality of recording media.

12. An optical disc device, comprising:
    an optical pickup unit to irradiate a recording medium in a plurality of recording media with a light from a light source;
    a user data signal generation unit that generates a recorded waveform of the light irradiation for recording to record user data in a user data area on the recording medium;
    a signal processing unit that processes a reading signal from the optical pickup unit; and
    a particular pattern signal generation unit that determines a recorded waveform of the light to record a particular pattern outside the user data area, the particular pattern having a lifetime shorter than a reference lifetime of the user data, a particular pattern signal read by the signal processing unit when the particular pattern is irradiated by the optical pickup unit, a quality of the user data corresponding to a quality of the particular pattern signal, wherein the reference lifetime is an intermediate value in a user data lifetime distribution that corresponds to a lifetime value for which user data recorded on a percentage of the recording media in the plurality of recording media is preserved.

13. The optical disc device according to claim 12, further comprising an acceleration test processing unit for evaluating the reading signal through an acceleration test, wherein the particular pattern signal generation unit determines the recorded waveform to record the particular pattern on the basis of processed results of the acceleration test processing unit.

14. A recording/reproducing system, comprising:

a recording medium in a plurality of recording media having a particular pattern recorded thereon, the particular pattern having a lifetime shorter than a reference lifetime of user data recorded in a user data area, the particular pattern recorded outside the user data area;

an optical pickup unit to irradiate the recording medium with a light from a light source, a particular pattern signal read by the optical pickup unit when the particular pattern is irradiated;

a user data signal generation unit that generates the recorded waveform of the light to record the user data;

a quality evaluation unit to evaluate a quality of the particular pattern signal from the optical pickup unit and determine a quality of the user data based on the evaluated quality of the particular pattern signal; and a timing control unit to instruct the quality evaluation unit to evaluate the quality at an inspection time, wherein the reference lifetime is an intermediate value in a user data lifetime distribution that corresponds to a lifetime value for which user data recorded on a percentage of the recording media in the plurality of recording media is preserved.

15. The recording/reproducing system according to claim 14, further comprising:

a storage environment measurement unit to measure a storage environment of the recording/reproducing system; and a recorded waveform generation unit to determine the recorded waveform on the basis of the measured result.

* * * * *